US008428857B2

(12) United States Patent
Kwong et al.

(10) Patent No.: US 8,428,857 B2
(45) Date of Patent: Apr. 23, 2013

(54) METHOD AND APPARATUS MATCHING INCOMING TO OUTGOING VEHICLE SIGNATURES TO ESTIMATE ARTERIAL VEHICULAR MOVEMENT

(75) Inventors: Karric Kwong, Vallejo, CA (US); Robert Kavaler, Kensington, CA (US); Ram Rajagopal, El Cerrito, CA (US); Pravin Varaiya, Berkeley, CA (US)

(73) Assignee: Sensys Networks, Inc., Berkely, CA (US)

( * ) Notice: Subject to any disclaimer, the term of this patent is extended or adjusted under 35 U.S.C. 154(b) by 484 days.

(21) Appl. No.: 12/506,182

(22) Filed: Jul. 20, 2009

(65) Prior Publication Data

US 2010/0017104 A1 Jan. 21, 2010

Related U.S. Application Data

(60) Provisional application No. 61/081,844, filed on Jul. 18, 2008.

(51) Int. Cl.
*G06F 19/00* (2011.01)

(52) U.S. Cl.
USPC .......................................... 701/117; 340/933

(58) Field of Classification Search .................. 701/117; 340/911, 933, 934, 935
See application file for complete search history.

(56) References Cited

U.S. PATENT DOCUMENTS

| | | | | |
|---|---|---|---|---|
| 6,750,787 | B2 * | 6/2004 | Hutchinson | 340/942 |
| 6,781,523 | B2 * | 8/2004 | Matsui et al. | 340/910 |
| 2002/0000921 | A1 * | 1/2002 | Hutchinson | 340/942 |
| 2002/0107634 | A1 * | 8/2002 | Luciani | 701/117 |
| 2002/0145541 | A1 * | 10/2002 | Matsui et al. | 340/934 |
| 2002/0154032 | A1 * | 10/2002 | Hilliard et al. | 340/933 |
| 2004/0246177 | A1 * | 12/2004 | Lloyd et al. | 342/453 |
| 2005/0157909 | A1 * | 7/2005 | Griffin | 382/115 |
| 2005/0203697 | A1 * | 9/2005 | Dalgleish | 701/117 |

FOREIGN PATENT DOCUMENTS

KR 10-0820467 B1 4/2008

* cited by examiner

*Primary Examiner* — Helal A Algahaim
(74) *Attorney, Agent, or Firm* — Earle Jennings; Gregory Scott Smith; GSS Law Group

(57) ABSTRACT

A roadway information system is disclosed with components generating and using vehicle signatures for vehicles passing near sensor pods located on or near lanes. Means and/or processors for matching incoming and outgoing vehicle signatures are disclosed creating an in-out vehicle match table used to generate a vehicle movement estimate or its components including a travel time and/or vehicle count.

32 Claims, 16 Drawing Sheets

METHOD AND APPARATUS MATCHING INCOMING TO OUTGOING VEHICLE SIGNATURES TO ESTIMATE ARTERIAL VEHICULAR MOVEMENT

CROSS REFERENCE TO RELATED APPLICATIONS

This application claims priority to U.S. Provisional patent application No. 61/081,844, filed Jul. 18, 2008, which is incorporated herein in its entirety.

TECHNICAL FIELD

The readings of at least magnetic sensors are used to estimate vehicular movement on at least one lane of at least one arterial roadway and those vehicular movement estimates are used to determine the status of roadways and/or multi-lane nodes and/or provide traffic feedback possibly to drivers of vehicles.

BACKGROUND OF THE INVENTION

There have been some approaches taken to estimating travel times on arterial links that include speed versus volume to capacity ratios, but these approaches have lacked the ability to accurately determine in real time what the travel time is on a link. Other approaches use a velocity estimate combined with inductive loop measurements, but have not reached the level of accuracy needed to be trusted in realtime arterial information systems. Methods and apparatus are needed to efficiently match or associate an incoming vehicle signature to an outgoing vehicle signature so that estimates of arterial movement can be effectively and accurately calculated in real time.

SUMMARY OF THE INVENTION

Embodiments are for a roadway information system that uses vehicle signatures for vehicles passing near sensor pods located on or near lanes. The vehicle signatures include a form of time stamp and at least one peak and trough. The vehicle signatures for each sensor pod are placed into a list. Successions of sensor pods reflect the vehicles in their travel successively passing over the sensor pods. A scorecard of at least a first to a second sensor pod are created giving at least a raw score to combinations of the vehicle signatures of vehicles going in from the first sensor pod, referred to as the incoming vehicle signatures, and the vehicle signatures of the vehicles going out through the second sensor pod, referred to as the outgoing vehicle signatures.

Embodiments include a means for matching the incoming vehicle signatures to the outgoing vehicle signatures by using the scorecard to create an in-out vehicle match table from which at least one vehicle movement estimate and/or a processor accessing the scorecard to create the in-out vehicle match table. The means for matching and/or the processor may include at least one instance of a finite state machine and/or a computer accessibly coupled with a memory containing a program system for instructing the computer, and/or an inferential engine interacting with a rule set, with any of these being in accord with the methods of matching through the use of the scorecard to create the in-out vehicle match table. Embodiments also include the program system residing in a computer readable memory, configuration module to implement the finite state machine, an installation package that may create the program system, the configuration module and/or the rule set. Embodiments also include a server that may provide the program system and/or the rule system and/or the configuration module. The server may also provide a key to enable one or more of these embodiments to become or be operational.

Several embodiments are of interest: Matching incoming or outgoing vehicle signatures to a null signature, removing matched signatures from the list of remaining signatures that may be matched, matching later remaining incoming signatures with later outgoing signatures, and using a quality estimate to assess whether a particular match should be made based upon collective quality estimate of the remaining matches.

DETAILED DESCRIPTION OF DRAWINGS

Figure 1A:
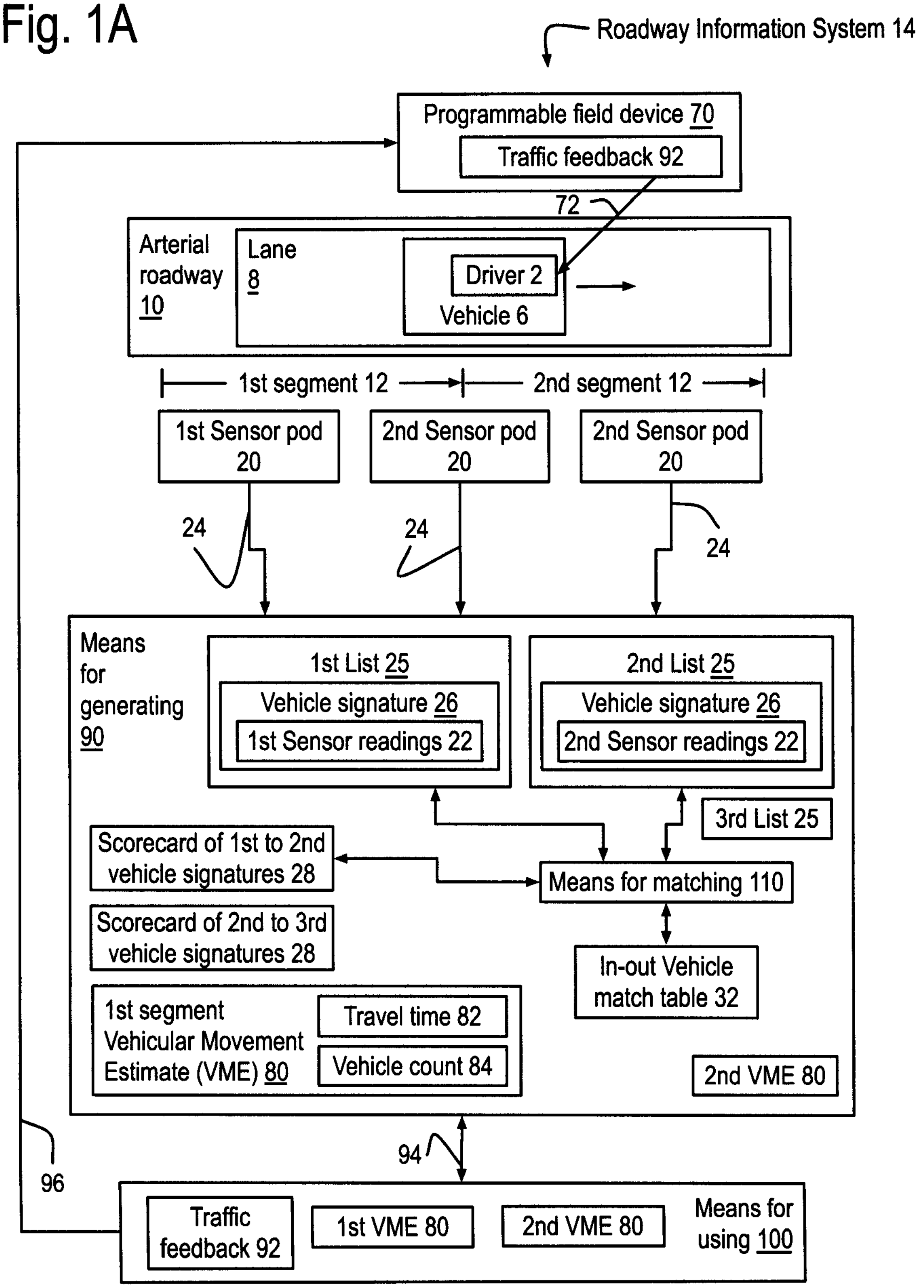
FIGS. 1A to 1C show examples of roadway information systems including at least one means for matching and a processor accessing at least scorecards of vehicle signatures between successive sensor pods to create an in-out vehicle match table that is used to generate vehicle movement estimates (VME), that are then used to create at least one traffic feedback.
Figure 1B:
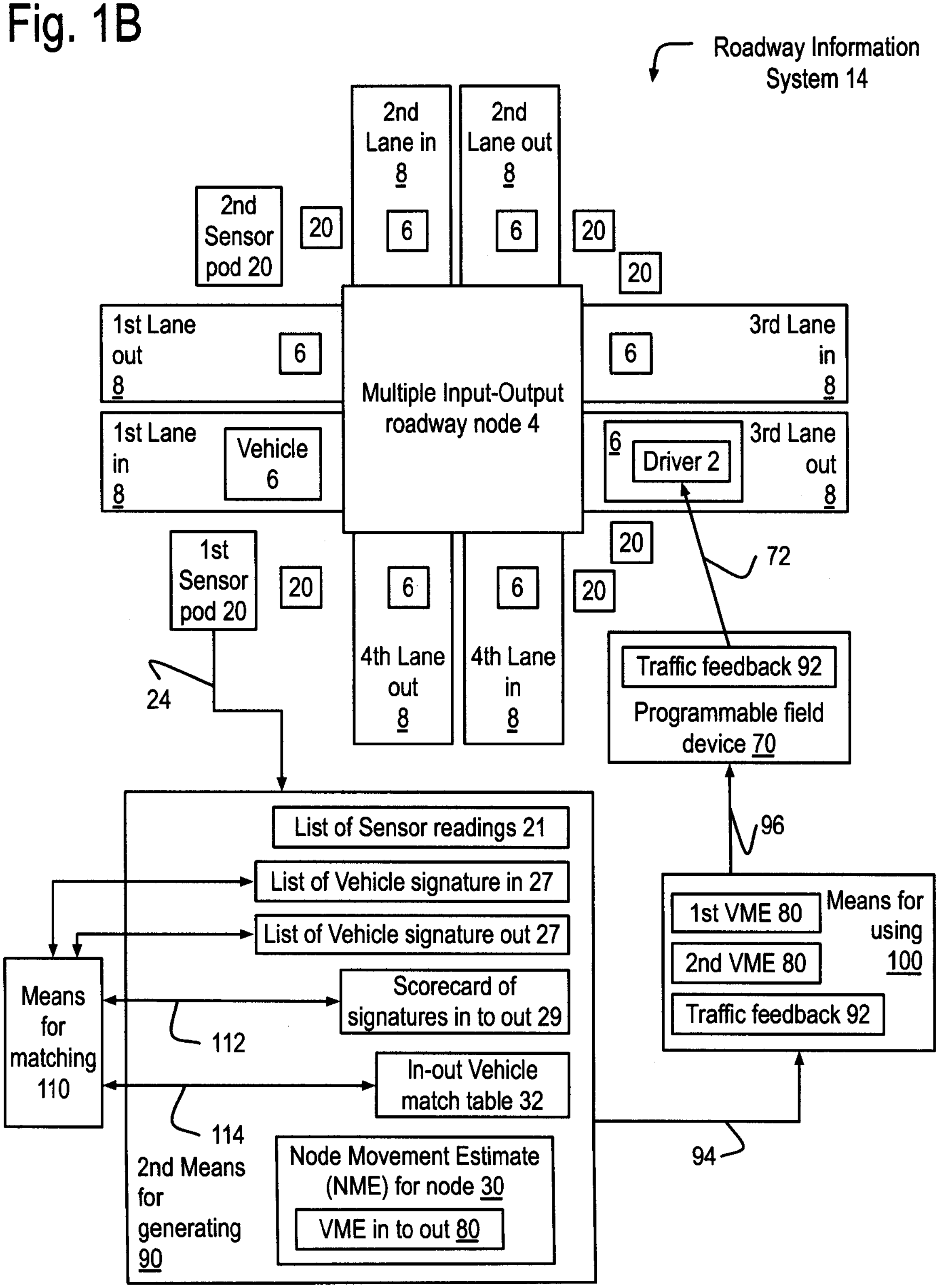
Figure 1C:
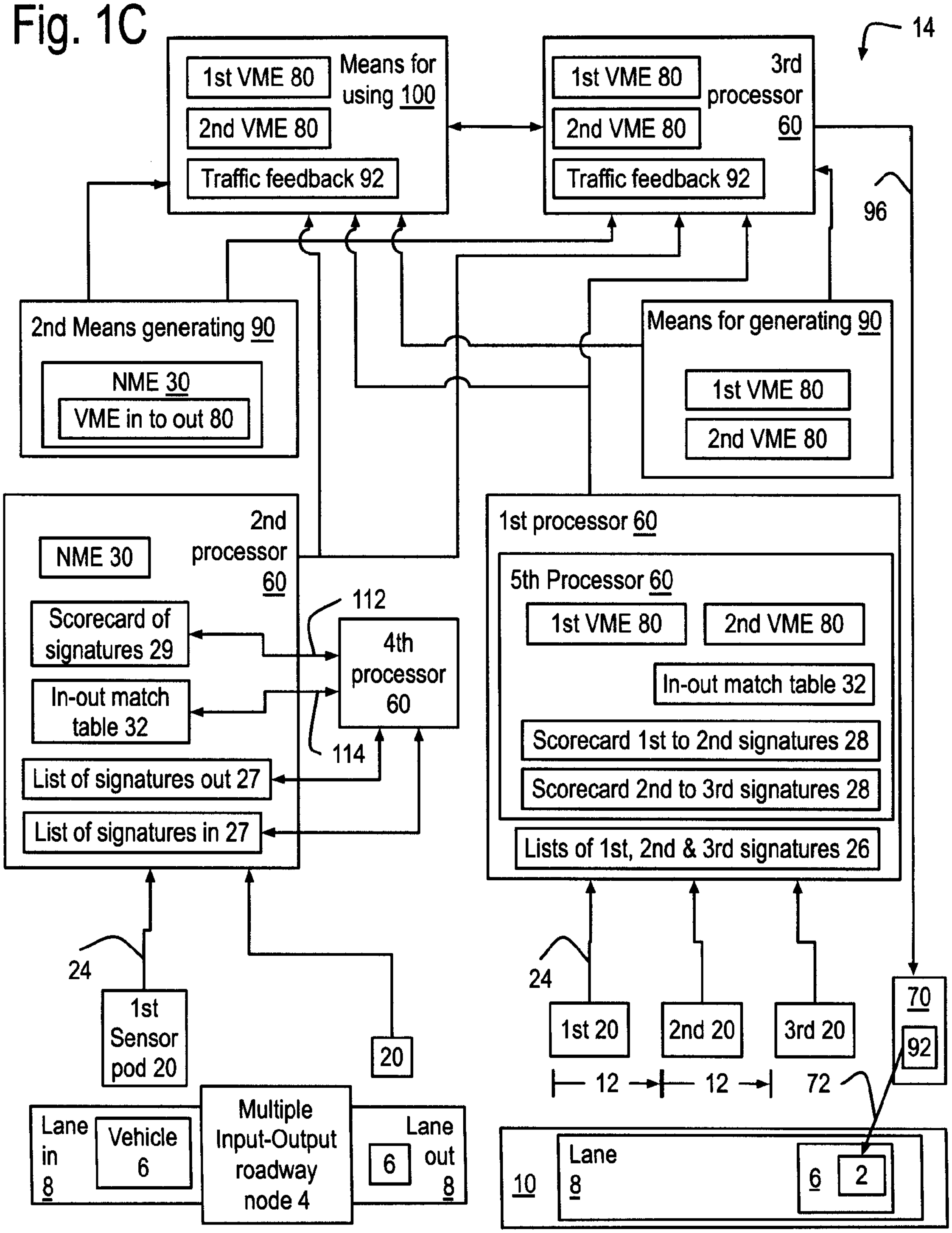

Sensor readings are used to estimate vehicular movement on at least one lane of at least one arterial roadway and those vehicular movement estimates are used to determine the status of roadways and/or multi-lane nodes and/or provide traffic feedback possibly to drivers of vehicles. The various embodiments of the invention will be formulated in terms of the means for performing certain functions of a roadway information system as well as in terms of instances of processors that may provide at least part of one or a combination of enabling means for performing the functions. FIGS. 1A to 1C give examples of these embodiments and the possibilities that all of them may be implemented and communicate with each other.

Figure 2:
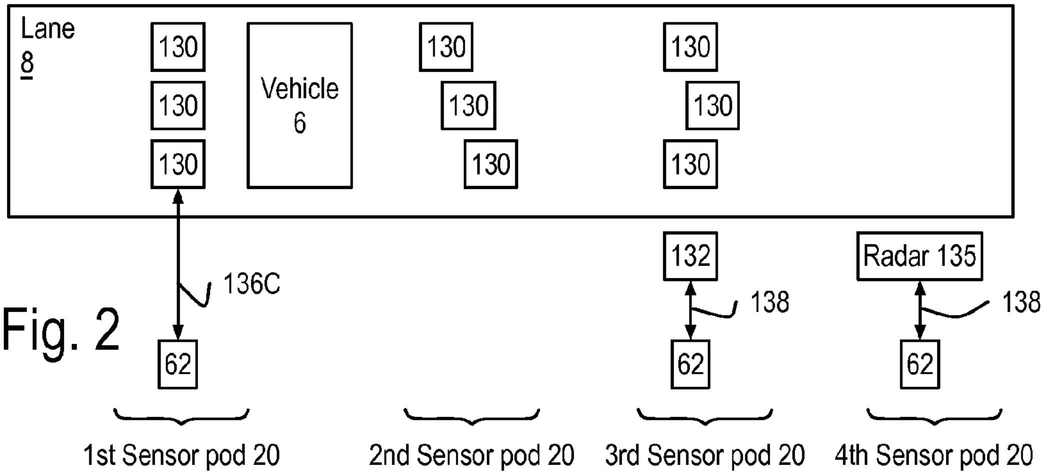
FIG. 2 shows some examples of the sensor pods of FIGS. 1A to 1C.

FIG. 1A shows example embodiments including methods and apparatus represented as at least one instance of a means for generating 90 a vehicular movement estimate 80 using vehicle signatures 26 acquired 24 based upon sensor readings 22 of at least two sensor pods 20 including magnetic sensors 130 as shown in FIG. 2 to create at least one Vehicular Movement Estimate (VME) based upon presence of at least one vehicle 6 passing near the sensor pods of at least one lane 8 of at least one arterial roadway 10. The means for generating may match at least one scorecard 28 of the vehicle signatures 26 from the first sensor pod 20 shown here as the first list 25 to the vehicle signatures of its successor, the second sensor pod in the second list 25, to create the in-out vehicle match table 32. The VME may be created based upon the in-out vehicle match table. The means for generating may further include a means for matching 110 accessing at least one scorecard 28 of the vehicle signatures 26 from the first sensor pod 20 show here as the first list 25 to the vehicle signatures of its successor, the second sensor pod in the second list 25 to create the in-out vehicle match table 32. The vehicular movement estimate 80 may be sent 94 to at least one instance of a means for using 100 the vehicular movement estimates to create a traffic feedback 90 that may be sent 96 to a feedback display 70, where it may be stored and/or presented 72 to inform at least one driver 2 of the vehicle of roadway conditions and/or projected travel duration and/or to regulate the vehicle based upon the operation of intersection and/or ramp metering signals.

The vehicle movement estimate 80 may include an estimate of a travel time 82 between the first sensor pod 20 and the second sensor pod that delimit the first segment 12, as well as an estimate of a vehicle count 84 traversing the first segment during a time period. The time period may be as short as a fraction of a minute or may be longer, such as fifteen minutes. The VME may further include an estimate of the vehicle's 6 speed traversing the segment and/or a queue depth of vehicles waiting at an intersection control ands/or freeway ramp meter.

The instances of the means for generating 90 may operate as follows: as a vehicle 6 travels on the lane 8 passing a succession of sensor pods 20 that communicate via communication couplings 24 with the means for generating 90 to acquire at least one vehicle signature 26 based upon at least one sensor reading 22 from at least one of the sensor pods to create a list 25 of vehicle signatures 26. A scorecard 28 including the score of the vehicle signatures of the first list matching the vehicle signatures of the second list is generated. The means for matching the vehicle signatures from the first sensor pod 20 to the second sensor pod 20 accesses the scorecard to create the in-out vehicle match table 32. The in-out vehicle match table is then used to generate a Vehicle Movement Estimate (VME) 80 of the first segment 12, which includes a travel time 82 and the vehicle count 84 that approximates how long it took vehicles 6 to traverse the first segment and how many vehicles did so. This estimate has in experiments been found to have a good approximation to actual vehicle travel times across the segment 12 and actual vehicle counts of vehicles traversing the segment, in some experiments offering more than 90 percent accuracy.

As used herein, the traffic on an arterial roadway 10 may include at least one vehicle 6 whose source and/or destination may not located on the roadway. By way example, an arterial roadway may be a surface street and/or a freeway on ramp and/or a freeway exit. The vehicle may park on or near the arterial roadway, possibly in a parking structure, effectively disappearing from the roadway. Alternatively, a vehicle may enter the arterial roadway from a parked position and/or a driveway and/or an alley.

In some embodiments, the vehicle signatures 26 may be generated by the sensor pods and in others they may be generated at the means for generating 90. The raw sensor readings 22 may or may not be found in the means for generating 90, possibly only existing within the sensor pods. They are shown in this Figure to clarify the invention and not to infer a limitation that the sensor readings exist in the means for generating 90.

The means for using 100 the vehicle movement estimate 80 may create a traffic feedback 92. At least one programmable field device 70 may be operated through the sending 96 of a version of the traffic feedback to it, where it may be stored and/or used to direct the programmable field device to present the traffic feedback to at least a driver 2 of the vehicle 6. Examples of traffic feedback and of the programmable field devices will be discussed shortly.

FIG. 1B shows the roadway information system 14 of FIG. 1A being applied to a multiple Input-Output roadway node 4 with multiple lanes 8 in or out of the node, with at least two and preferably all the lanes configured with at least one sensor pod 20 near the lane and at least some and may be all of these sensor pods communicating with at least one instance of a second means for generating 90 a node movement estimate 30 that may include a vehicle movement estimate 80 for a lane in to a lane out, possibly for each of the combinations of lanes in to lanes out of the multiple Input-Output roadway node. At least one of the Vehicle Movement Estimates (VME) may be sent 94 to an instance of the means for using 100 these VME to create at least one traffic feedback 92 that may be sent 96 to a programmable field device 70 for storage and possibly presented to a driver 2 of at least one of the vehicles 6.

The means for matching 110 may in some embodiments be separate from the means for generating 100 as shown here. In such embodiments, the means for matching 110 may be first accessibly coupled 112 with the scorecard 29 of incoming vehicle signatures to outgoing vehicle signatures. The means for matching 110 may be coupled 114 with the in-out vehicle match table 32. In certain embodiments, the scorecard and/or the in-out vehicle match table may be included in the means for matching, with the means being coupled 112 and/or 114 with the means for generating 90, which while not shown may be seen as an equivalent embodiment to those shown in these examples. The couplings 112 and/or 114 may use implementations of one or more of wireline and/or wireless communications protocols.

FIG. 1C shows some possible implementations including the means of the previous Figures and implementations based around processors 60 as the apparatus implementing the various functions of the roadway information system 14. One implementation may include a first processor 60 that may communicate 24 with at least one and preferably multiple sensor pods 20 that may delimit segments 12 to possibly create at least one Vehicle Movement Estimate (VME) 80 for a segment. Another implementation may include a second processor 60 that may communicate 24 with at least two sensor pods 20, one situated near at least one lane 8 in and another sensor pod 20 near a lane 8 out of a multiple Input-Output roadway node 4. And another implementation may include a third processor 60 receiving at least one vehicle movement estimate 80 from at least one of a means for generating 90 the VME 80 and possibly a Node Movement Estimate (NME) 30 through possibly receiving the VME of one of the lanes in to one of the lanes out of the multiple Input-Output roadway node 4 to create at least one traffic feedback 92 that may be sent 96 to at least one programmable field device 70 for presentation 72 to the driver 2 of at least one of the vehicles 6.

The first processor 60 and/or the second processor may communicate 112 with a fourth processor the scorecard 29 and/or 28 to assist the fourth processor in creating the in-out vehicle match table 32 as shown in the left half of FIG. 1C. Alternatively, the first processor and/or the second processor may include the fifth processor that has access to the scorecards 28 and/or 29 to create the in-out vehicle match table 32 as shown in the right half of FIG. 1C.

FIG. 2 shows an example of some details of various implementations of the sensor pods 20 of FIG. 1. The first sensor pod 20 may include at least one processor 62 communicatively coupled 136C to at least one magnetic sensor 130 to detect magnetic field fluctuations caused by the vehicle 6 passing near the magnetic sensor. The magnetic sensor may used to generate at least field strength readings referred to herein as the magnetic readings 132. The sensor pod may further include at least two and often may include more than two magnetic sensors, for instance, three or as many as at least seven. The vehicle's 6 presence may be determined as a non-negative function, usually monotonic that when over some threshold indicates the presence of a vehicle crossing over the sensor pod. For example, assuming seven magnetic sensors in the pod, one referred non-negative function logically Ors the sensor readings of the middle three sensors and the threshold is some fraction of the total sensor range, possibly at least 4%.

The second sensor pod 20 may include at least one and possibly two or more magnetic sensors that may not be communicatively coupled to a processor 62 within the sensor pod. An example of such an implementation may include the use of an ethernet, possibly a power over ethernet communication scheme in which the sensors, in particular, the magnetic sensors 130 may communicate directly with at least one of the means for generating 90 the vehicle movement estimate 80 and/or may communicate directly with a first or second processor 60 as shown in FIG. 1C.

The third sensor pod 20 may include an optical sensor 132 that may further communicate 138 with a processor 62. In other implementations, the optical sensor may not communicate with a processor within the sensor pod, but may directly communicate with with at least one of the means for generating 90 the vehicle movement estimate 80 and/or may communicate directly with a first or second processor 60 as shown in FIG. 1C.

And the fourth sensor pod 20 may include a radar 135 that may also communicate 138 with the processor 62. with at least one of the means for generating 90 the vehicle movement estimate 80 and/or may communicate directly with a first or second processor 60 as shown in FIG. 1C.

Various combinations of magnetic sensors 130, optical sensors 132 and/or radars 135 may be included in one of the sensor pods 20.

Each sensor pod 20 may include at least three magnetic sensors 130 arranged in a configuration that is not entirely parallel to the direction of traffic flow on at least one lane 8 as shown for the second and third sensor pods. In some embodiments, the magnetic sensors may approximate a line on the lane perpendicular to the traffic flow as shown for the first sensor pod. Each sensor pod may preferably include at least three magnetic sensors separated from each other, preferably by a distance, often preferred to be at least 25 centimeters (cm), although more sensors may be preferred, possibly with seven magnetic sensors separated by about 30 cm from each other.

Figure 3:
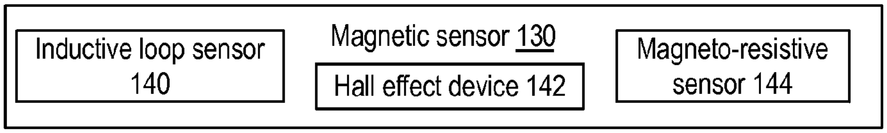
FIG. 3 shows some details of the magnetic sensors that may be included in the sensor pods.

FIG. 3 shows the magnetic sensor 130 of FIG. 2 may employ at least one inductive loop sensor 140, at least one Hall effect device 140, and/or a magneto-resistive sensor 144 to generate the field strength readings, referred to herein as magnetic readings 134.

Figure 4:
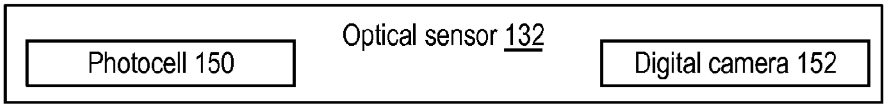
FIG. 4 shows some details of the optical sensors that may be included in the sensor pods.

FIG. 4 shows examples of the optical sensor 132 of FIG. 2 that may include a photocell 150 and/or a digital camera 152. In some embodiments, the optical sensor may be limited in its capabilities to preclude the exact identification of the vehicle 6 and/or its driver 2.

The magnetic sensors 130, the optical sensors 132 and/or the radar 135 may use various wireline and/or wireless communications protocols to communicate their sensor readings. For example, a wireline communication protocol such as Ethernet and/or Power-over-Ethernet may be preferred in some embodiments. In other embodiments an analog protocol may be employed to support collecting sensor readings from Hall effect devices 142 and/or inductive loop sensors 140.

By way of example, a wireless communication protocol may support at least one wireless communications standard. The network may support the IEEE 802.15 communications standard, or a version of the Global System for Mobile (GSM) communications standard. The version may be compatible with a version of the General Packet Radio Service (GPRS) communications standard. The network may support a version of the IS-95 communications standard, or a version of the IEEE 802.11 communications standard.

Figure 5:
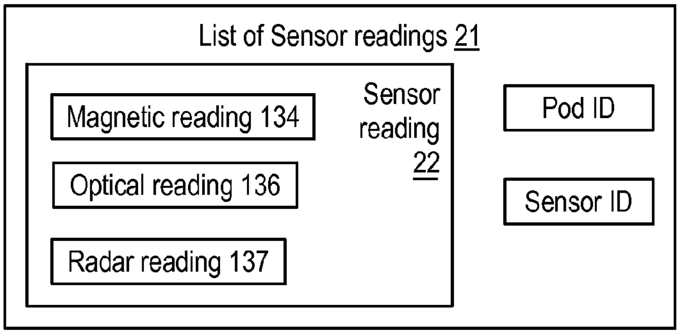
FIG. 5 shows some details of the list of sensor readings and the sensor readings.

FIG. 5 shows an example of the list of sensor readings 21 of FIGS. 1B and 1C including at least one sensor reading 22 for a sensor pod 20 as also shown in FIG. 1A and possibly a sensor pod identifier and/or sensor identifier. The sensor reading 22 may include at least one magnetic reading 134 and may further include at least one optical reading 136 and/or at least one radar reading 137. In some embodiments, the sensor 130, 132 and/or 135 identifier and/or the sensor pod 20 identifier may be implicit in the implementation of the data structure and/or class structure of the implementation.

Figure 6:
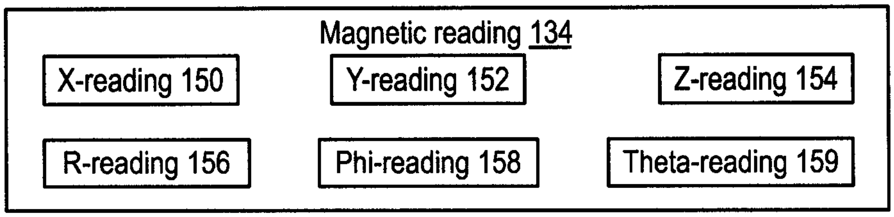
FIG. 6 show some details of the various typical forms of the magnetic readings.

FIG. 6 shows the magnetic reading 134 may include at least one, possibly two and perhaps three dimensions, which will be referred to as the X-reading 150, the Y-reading 152 and the Z-reading 154. Alternatively, the magnetic reading may include an R-reading 156, possibly a Phi-reading 158 and further possibly a Theta-reading 159 to form a spherical coordinate representation of the field strength. Another alternative, the magnetic reading may include the R-reading, the Phi-reading and the Z-reading to form a polar coordinate representation of the field strength.

Figure 7:
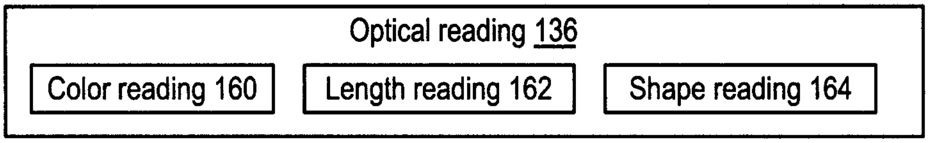
FIG. 7 shows some details of typical forms of the optical readings.

FIG. 7 shows some details of the optical reading 136 that may include a color reading 160, a length reading 162 and/or a shape reading 164. In certain embodiments, the optical reading may be configured to eliminate the specific identification of the vehicle license plate or driver's face to comply with privacy constraints to which the optical sensors 132 may need to comply.

Figure 8:
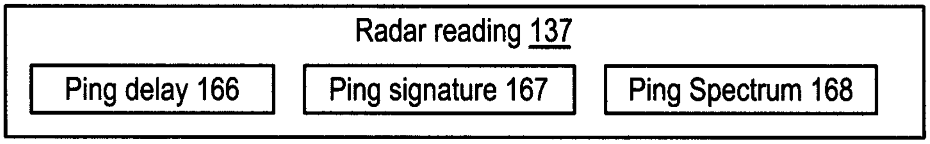
FIG. 8 shows some details of some typical forms of the radar readings.

FIG. 8 shows some details of the radar reading 137 that may include a ping delay 166, a ping signature 167 and/or a ping spectrum 168.

Figure 9:
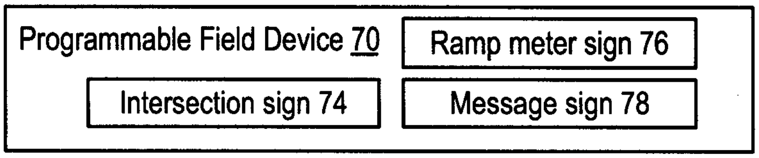
FIG. 9 shows some examples of the programmable field devices.

FIG. 9 shows examples of the programmable field device 70 that may include at least one instance of an intersection sign 74, a ramp meter sign 74 and/or a message sign 78.

Figure 10:
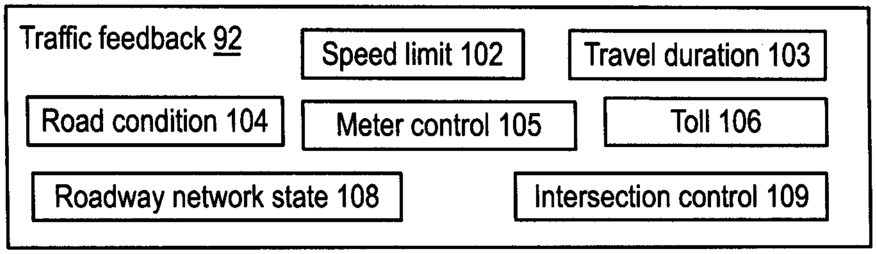
FIG. 10 shows some examples of the traffic feedback.

FIG. 10 shows some details of the traffic feedback 92 that may include at least one instance of at least one of the following: a speed limit 102, a travel duration 103, a road condition 104, a ramp meter control 105, a toll 106, a roadway network state 108 and/or an intersection control 109. For example the travel duration of the traffic feedback may estimate the time it will take a vehicle 6 to reach San Francisco from Berkeley, which entails traveling up a ramp onto a freeway, across a bridge, possibly traveling on a second freeway, then down an off-ramp, rather than the travel time through a roadway multiple Input-Output node 4 or through a segment 12 of a line 8 on an arterial roadway. The road condition may indicate that all traffic on that segment or between two common destinations is stalled. The roadway network condition may include an indication of grid lock and/or suggest detour directions around a congested area.

Figure 11:
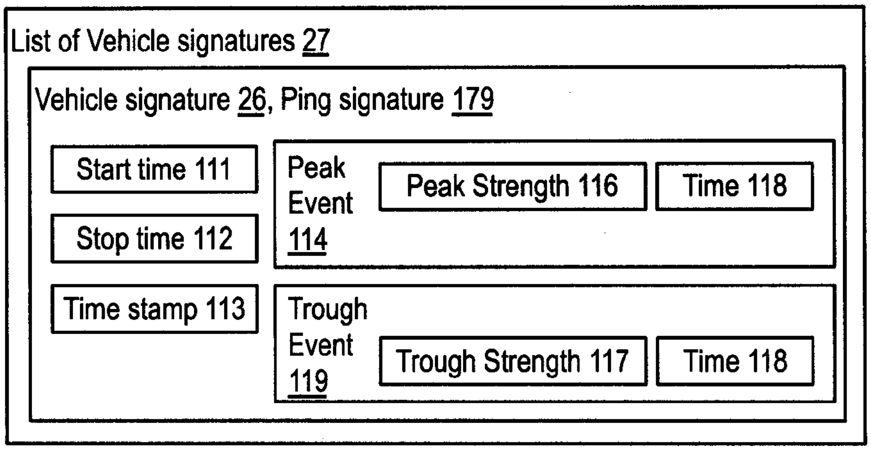
FIG. 11 shows some details of the list of vehicle signatures, and some typical forms of the vehicle signatures and/or the ping signatures of one of the radars.

FIG. 11 shows a list of vehicle signatures 27 of FIGS. 1B and 1C including at least one vehicle signature 26, with indications of a start time 111, a stop time 112, at least one event 114 including a peak strength 116 and a first time 118, as well as at least one other event including a trough strength 117 and at different time 118. The ping signature 169 may include similar components to the vehicle signature 26.

In particular, the vehicle signature 26 and/or the ping signature 169 may include a time stamp 113 and/or a start time 111 and a stop time 112. In certain embodiments, the start time and/or the stop time may be provided and the time stamp inferred as a function of one or both of them. By way of example, the time stamp may be the start time, or it may be the stop time, or it may be the average of the start time and the stop time. The sensor pods 20 may share a synchronized time that may be accurate to within one hundredth of a second, to within a millisecond or to within a fraction of a millisecond. Alternatively, not all the sensor pods and/or their sensors 130, 132 and/or 135 may shared the synchronized time.

Figure 12:
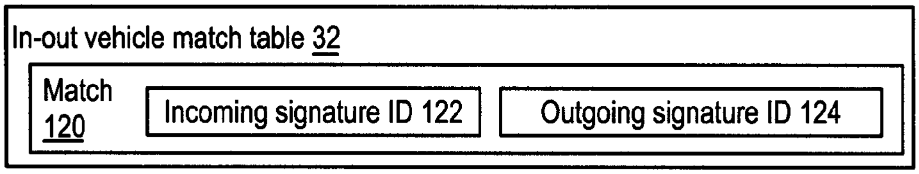
FIG. 12 shows some details of the in-out match table.

Each of these vehicle signatures 26 may be assigned a vehicle signature identification that may be used to create the in-out vehicle match table 32 as shown in FIGS. 1A to 1C and in further detail in FIG. 12. Note that in some embodiments, the identifications may be the index or indices of an array whose entry represents the vehicle signature 26. In other embodiments, the identification may be a pointer to a memory location associated with the vehicle signature. In other embodiments, the identification may be a handle to an instance of a class object in an object oriented runtime environment such as a C++ or java runtime environment.

FIG. 12 shows some further details of the in-out vehicle match table 32 as including at least one and often more than one match 120 that further includes a incoming vehicle signature identification 122 and an outgoing vehicle signature identification 124. In some embodiments, there may be a simplifying assumption made that a vehicle 6 must enter a segment 12 or incoming lane 8 before it may leave the segment or enter the outgoing lane of the multiple Input-Output roadway node 4. In such embodiments, the outgoing signature identification 124 may be later than the incoming signature identification 122. For example, in some embodiments, the vehicle signature identified as the incoming signature may have a start time 111 before the vehicle signature identified as the outgoing vehicle signature. Another example, the incoming vehicle signature stop time 112 may be before the outgoing vehicle signature stop time.

Figure 13A:
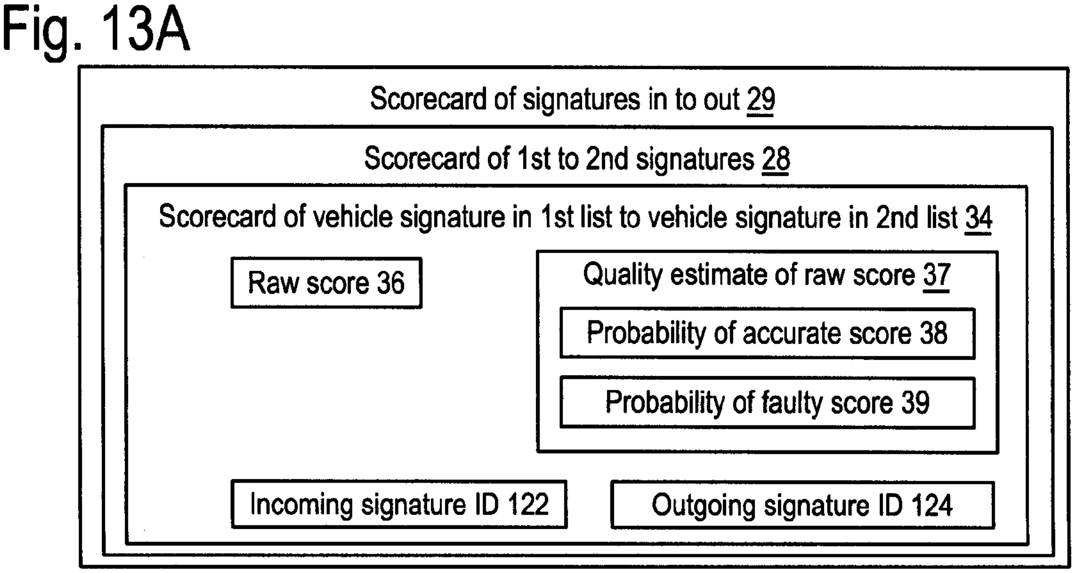
FIG. 13A shows some details of some typical variations in the scorecards.

FIG. 13A shows some examples of the scorecard mechanism 28 and/or 29 in accord with certain embodiments. In the situation of segments 12 of a lane 8, the processor 60 and/or the means for generating 90 may generate and/or maintain a scorecard 28 of vehicle signatures for the first segment 12 and possibly for a second segment or more. In the situation of a multiple Input-Output roadway node 4, the processor 60 and/or the means for generating 90 may generate and/or maintain a scorecard of vehicle signatures in to out 29 that may include a scorecard 28 of vehicle signatures for at least one lane 8 into the node to vehicle signatures for at least one lane 8 out of the node. Note that in some embodiments, the node 4 may not legally or realistically allow a vehicle from any incoming lane 8 to exit to any outgoing lane, whereas in situations, such as when the node 4 is a round about, that may be exactly true. The scorecard may in some situations only account for reasonable, realistic and/or legal incoming to outgoing situations.

These collective scorecards 28 and/or 29 may include a scorecard 34 for a specific incoming vehicle signature 112 in to a specific vehicle signature 114 out that may include a raw score 36 and may possibly include a quality estimate 37 of the raw score being the actual match of the incoming vehicle signature to the outgoing vehicle signature. In certain embodiments, the quality estimate may include a probability of that raw score being successful 38 and/or a probability of that raw score being faulty 39. The raw score may represent the result of applying a similarity distance metric from the incoming 122 to outgoing 144 vehicle signatures 26.

Before proceeding with the development of various embodiments that generate or use the vehicle movement estimates 80, consider some examples of the apparatus that may be used to implement these embodiments.

Figure 13B:
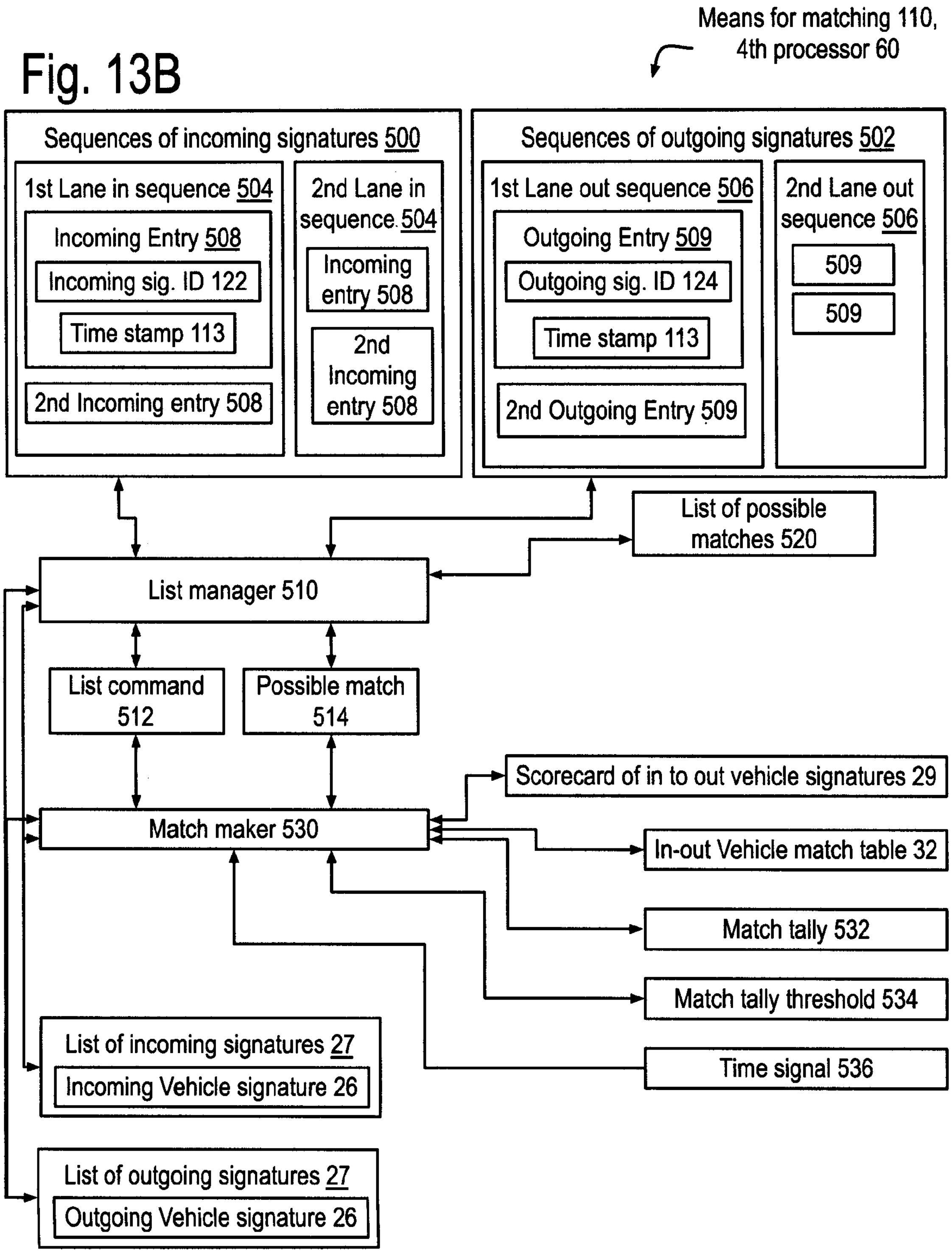
FIG. 13B shows a block diagram of some details of means for matching of FIGS. 1D to 1F and/or the fourth processor of FIG. 1G, any or all of which may match the list of incoming and outgoing vehicle signatures to create the in-out vehicle match table. These various embodiments may include a list manager for a list of possible matches and a match maker interacting with the list manager to generate the in-out vehicle match table. The match maker may update a match tally when a match is asserted and may respond to the match tally exceeding the match tally threshold by committing the matches and the use of the in-out vehicle match table to update the vehicle movement estimates that may then be used by the roadway information system, because these estimates are now accurate enough. This is a preemptive triggering of the generation of the vehicle movement estimates as soon as the estimates are deemed accurate enough.

FIG. 13B shows a block diagram of some details of means for matching 110 of FIGS. 1D to 1F and/or the fourth processor 60 of FIG. 1G, any or all of which may match the list of incoming and outgoing vehicle signatures 27 to create the in-out vehicle match table 32. These various embodiments may include a list manager 510 for a list of possible matches 520 and a match maker 530 interacting with the list manager to generate the in-out vehicle match table 32. The match maker 530 may update a match tally 532 when a match is asserted and may respond to the match tally exceeding the match tally threshold 534 by committing the matches and the use of the in-out vehicle match table to update the vehicle movement estimates 80 that may then be used by the roadway information system 14, because these estimates are now accurate enough. This is a preemptive triggering of the generation of the vehicle movement estimates 80 as soon as the estimates are deemed accurate enough. In certain embodiments, a time signal 536 may used to trigger the commitment to the in-out vehicle match table 32 possibly the creation of the vehicle movement estimates 80 and/or the node movement estimate 30. This time signal may in some embodiments be implemented using a clock timer interrupt and/or a flag set in a memory 146, as will be discussed shortly with regards FIG. 14.

In certain embodiments, the list of incoming vehicle signatures 27 may be represented as a collection of sequences of incoming signatures 500 that may include a sequence 504 for each of the incoming lanes 8. Each of the incoming lane sequences 504 may include at least one incoming entry 508 that may further include an incoming vehicle signature identifier 122 and a form of time stamp 113.

Similarly, the list of outgoing vehicle signatures 27 may be represented as a collection of sequences of outgoing signatures 502 that may include a sequence 506 for each of the outgoing lanes 8. Each of the outgoing lane sequences 506 may include at least one outgoing entry 509 that may further include an outgoing vehicle signature identifier 124 and a form of time stamp 113.

These incoming lane sequences 504 and outgoing lane sequences 506 may be ordered by time so that their time stamps consistently increase or diminish as the entries of the sequence progress.

Before proceeding with the development of various embodiments that generate or use the vehicle movement estimates 80, consider some examples of the apparatus that may be used to implement these embodiments. The means 90, the means 100, the means 110, the list manager 510 and/or match maker 530 and/or the processor 60 may include at least one instance of a finite state machine 170 and/or a computer 174 accessibly coupled 178 with a memory 176 containing a program system 178 for instructing the computer 174, and/or an inferential engine 180 interacting with a rule set 182, with any of these being in accord with the methods of matching through the use of the scorecard to create the in-out vehicle match table as well as the program system residing in a computer readable memory, a configuration module to implement the finite state machine, an installation package that may create the program system, the configuration module and/or the rule set. Embodiments may also include a server that may provide the program system and/or the rule system and/or the configuration module. The server may provide a key to enable one or more of these embodiments to become or be operational.

Figure 14:
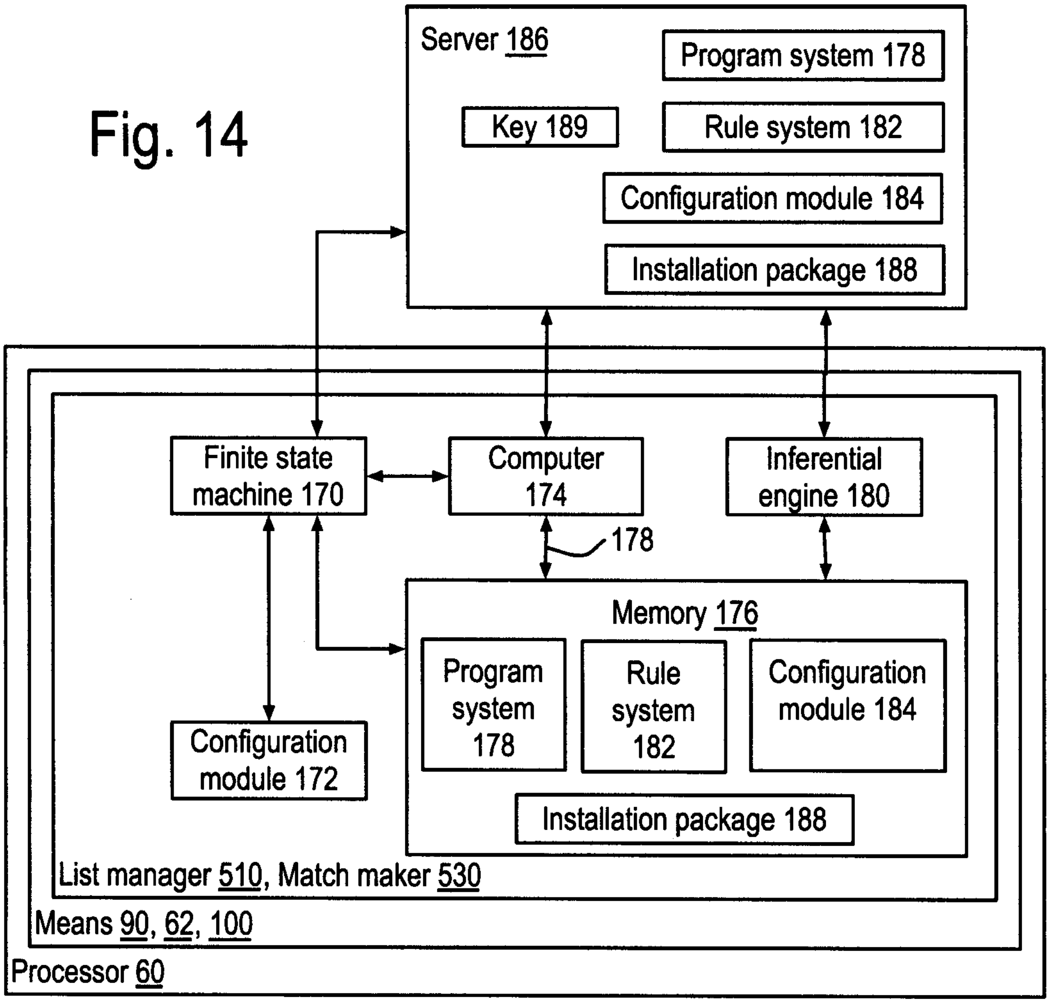
FIG. 14 shows some details of the means for generating the vehicle movement estimates, the means for using them, the means for matching that uses the scorecards to create the in-out vehicle match table, the match maker and/or the list manager, and/or at least one of the processors, as well as embodiments involving a program system, configuration module, rule set, installation package, any or all of which may relate to a finite state machine, a computer, an inferential engine and/or a server providing the program system, configuration module, rule set, installation package and/or a key for one or more of these embodiments.

FIG. 14 shows examples of the various processors 60, the means for generating 90, the vehicle movement estimate 80, the means for creating 62 the vehicle signatures 26, the means for using 100 the vehicle movement estimates 80 and/or the node movement estimate 30, and/or the means for creating 110 the in-out vehicle match table 32, any or all of which may include at least one instance of a finite state machine 170 and/or a computer 174 accessibly coupled 178 to a memory 176 and instructed by a program system 178 in accord with various embodiments of the methods and/or an inferential engine 180 that may act upon a rule system 182.

The memory 176 may implement a computer readable memory that may be removable. Other embodiments of the memory may include memory components that are volatile and/or non-volatile, where a volatile memory tends to lose its memory state without a regular injection of electrical power and a non-volatile memory tends to retain its state without regular power injections. The rule system 182 may be contained in an instance of the memory. Embodiments may include as apparatus a configuration module 172 that may configure at least one programmable logic device to create the finite state machine 170. Alternatively, the configuration may be included in an instance of the memory.

Embodiments may include an installation package 188 that may reside in the memory 176 and be used by the computer 174 to create and/or modify the program system 178, the rule system 182 and/or the configuration module 184.

Embodiments may further include a server 186 that may communicate with the finite state machine 170 and/or the computer 174 and/or the inferential engine 180. The server may contain a version of the program system 178, the rule system 182, the configuration module 184 and/or the installation package 188 that may be configured for download to at least one instance of the means for generating 90, means for using 100, means for creating 110, means 62 and/or the processor 60. Alternatively, the server may provide a key 189 to unlock or decrypt the program system, the rule system, the configuration module and/or the installation package for their use by the processor 60 and/or means 90 and/or means 62 and/or means 100.

By way of example, a finite state machine 170 may include at least one instance of a Field Programmable Gate Array (FPGA) and/or a Programmable Logic Device (PLD) and/or an Application Specific Integrated Circuit (ASIC).

As used herein a computer 174 includes at least one instruction processor and at least one data processor, with each data processor directed by at least one instruction processor, with at least one instruction processor instructed by the program step or steps of the program system 178 to support the implementation of the means and steps discussed herein.

As used herein, a finite state machine 170 includes at least one input, maintains at least one state based upon at least one of the inputs and generates at least one output based upon the value of at least one of the inputs and/or based upon the value of at least one of the states The embodiments of the invention may include means for performing something that may be considered a method. These means 90, 100, 110 and/or 62 may also include at least partial implementation as hardware. The means may include a program operation, or program thread, executing upon an instance of the computer 174, and/or a state transition in a finite state machine 170 and/or traversal of a node in an inferential graph of the inferential engine 180 and/or of its rule set 182. The means may start its operation by entering a subroutine or a macro instruction sequence in the computer, and/or directing a state transition in the finite state machine, possibly while pushing a return state. The means may terminate upon completion of those operations, which may result in a subroutine return in the computer, and/or popping of a previously stored state in the finite state machine, and/or returning to a previous level of inference in the inferential engine. However, upon termination, the means will not be considered to cease existing, in that a tangible structure will be retained at least for a while that may again be started, operated and then possibly terminated again.

The installation package 188 may include, but is not limited to, at least one of the following: source code, script code, at least one library, at least one compiled component and/or at least one compressed component. Examples of source code include, but are not limited to, text files that are syntactically and/or semantically consistent with programming languages such as C, C++, and assembler languages for various computers such as the Intel 8086 family, the PowerPC family and the ARM computer families. Examples of script code include make files. Examples of libraries include linkage libraries of compiled components. Compiled components may further include relocatable loader formatted components. Compressed components may include compressed files of any combination of the other components of the installation package.

The installation package 188 may operate by exploiting a weakness or back door in the operating environment to inject one or more root kits into the operating environment that may preferably alter one or more basic utilities of the operating environment. Operating the installation on a processor 60 may trigger the reflashing of firmware in the non-volatile memory to alter the operating environment.

Some of the following figures show flowcharts of at least one embodiment of the method, which may include arrows signifying a flow of control, and sometimes data, supporting various implementations of the invention's operations. These include a program operation, or program thread, executing upon a computer 174, and/or a state transition in a finite state machine 170 and/or a inferring the consequences of an inferential node by the inferential engine 180. The operation of starting a flowchart refers entering a subroutine or a macro instruction sequence in the computer, and/or directing a state transition in the finite state machine, possibly while pushing a return state and/or possibly backtracking from the inferential node and/or propagating the logical consequences in the inferential engine. The operation of termination in a flowchart refers completion of those operations, which may result in a subroutine return in the computer, and/or popping of a previously stored state in the finite state machine. The operation of terminating a flowchart is denoted by an oval with the word "Exit" in it.

Figure 15:
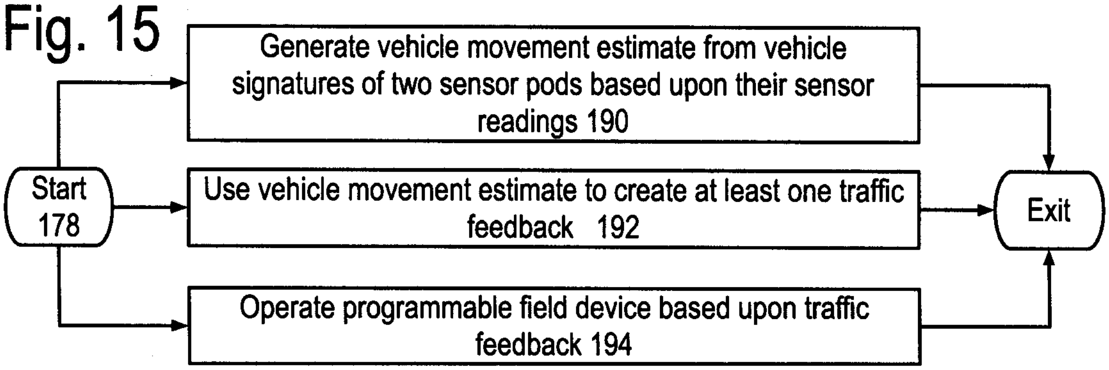
FIG. 15 shows some details of the collective program system implementing in summary form the various operations of embodiments of the method within the roadway information system.

FIG. 15 shows some details of one or more embodiments of the program system 178 of FIG. 14 that supports the operations of at least one of the means for generating 90 the VME 80, the means for using 100 the VME, the means for providing 62 the VME and/or at least one of the processors 60. The program system may include at least one of the following program steps:

Program step 190 supports generating the vehicle movement estimate 80 from vehicle signatures 26 of two sensor pods 20 based upon their sensor readings 22.

program step 192 supports using the vehicle movement estimate (VME) 80 to create at least one traffic feedback 92.

And program step 194 supports operating at least one programmable field device 70 based upon the traffic feedback 92.

Figure 16:
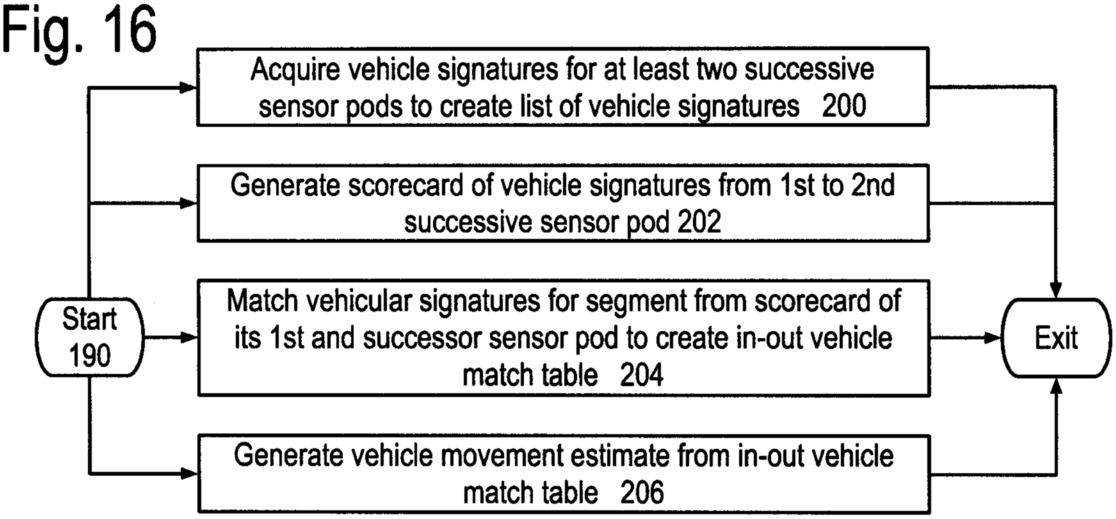
FIGS. 16 to 44 show further details of the program system and methods of FIG. 15.

FIG. 16 shows some details of one or more embodiments of the program step 190 of FIG. 15 that supports generating the vehicle movement estimate 80 from vehicle signatures 26 of two sensor pods 20 based upon their sensor readings 22. The program system may include at least one of the following program steps:

Program step 200 supports acquiring the vehicle signatures 26 for at least two successive sensor pods 20 to create the list 25 of vehicle signatures.

Program step 202 supports generating the scorecard 28 of the vehicle signatures from the first to the second, successive sensor pod.

Program step 204 supports matching the vehicle signatures for a segment from the scorecard of its first and successor sensor pod to create the in-out vehicle match table 32. This matching step may be accomplished using an implementation of dynamic programming, or hidden markov modeling, or with an algorithm derived from a genetic programming approach.

And program step 206 supports generating the vehicle movement estimate from the in-out vehicle match table.

Figure 17:
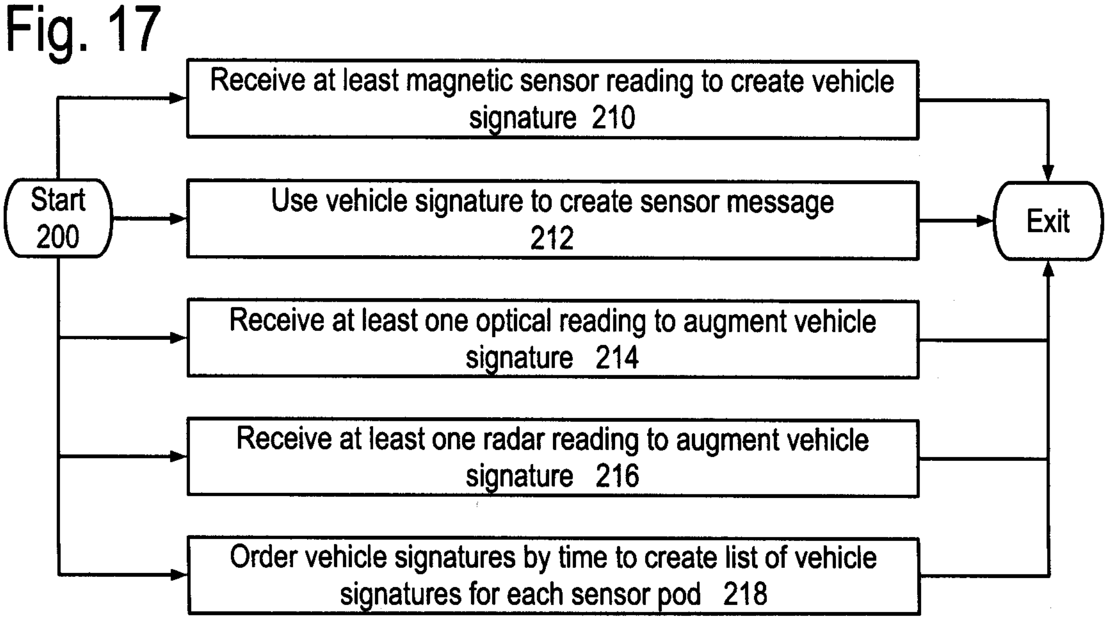

FIG. 17 shows a flowchart of some details of program step 200 of FIG. 16 further supporting acquiring the vehicle signatures for at least two successive sensor pods that may include at least one of the following program steps:

Program step 210 supports receiving at least the magnetic sensor reading 134 to create the vehicle signature 26, possibly be the means for generating 62 the vehicle signature and/or possibly by the means for generating the VME 90 and/or by at least one of the processors 60.

Program step 212 supports using the vehicle signature to create a sensor message to be sent to at least one of the means for generating 90 and/or to at least one of the processors 60.

Program step 214 supports receiving at least one optical reading 136 to augment the vehicle signature.

Program step 216 supports receiving at least one radar reading 134 to augment the vehicle signature.

And program step 218 supports ordering the vehicle signatures by a time, referred to herein as the time stamp 113 to create the list 27 of vehicle signatures 26 for each sensor pod 20.

Figure 18:
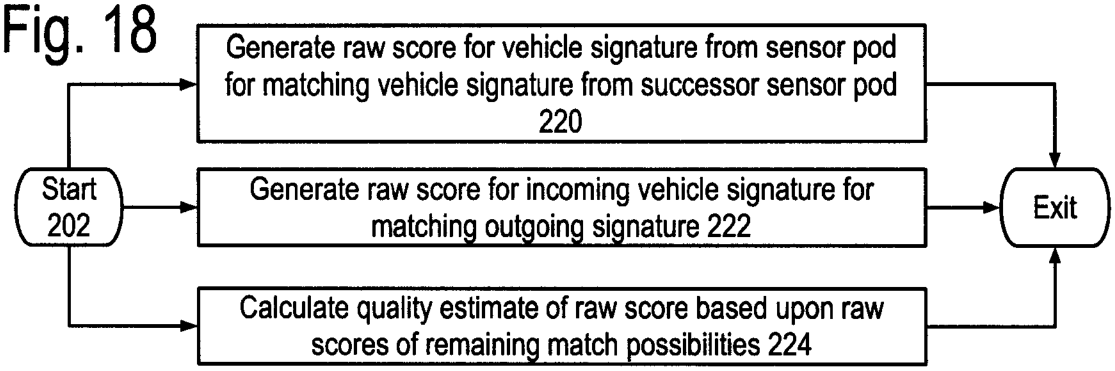

FIG. 18 shows a flowchart of some details of program step 202 of FIG. 16 further generating the scorecard of the vehicle signatures from the first to the second sensor pod 20.

Program step 220 supports generating the raw score 36 for the vehicle signature from the first sensor pod for matching the vehicle signature from the successor sensor pod.

Program step 222 supports generating the raw score for the incoming vehicle signature for matching the outgoing vehicle signature.

And program step 224 supports calculating the quality estimate 37 of the raw score based upon the raw scores of the remaining match possibilities.

Figure 19:
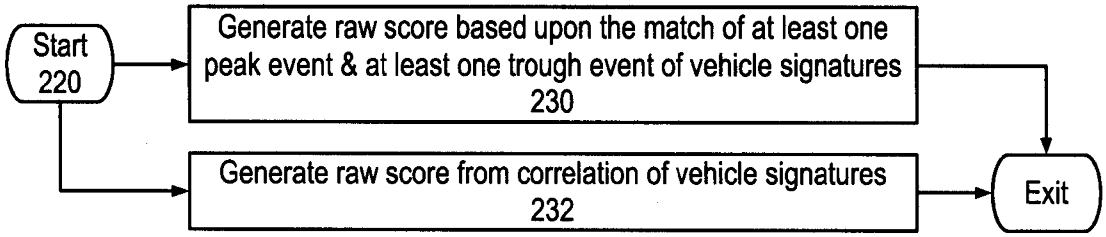

FIG. 19 shows a flowchart of some details of program step 220 of FIG. 18 generating the raw score 36 for the vehicle signature for matching the outgoing vehicle signatures that may include at least one of the following program steps: Program step 230 supports generating the raw score based upon the match of at least one peak event 114 and at least one trough event 116 of the vehicle signatures 26. And program step 232 supports generating the raw score from a correlation of the vehicle signatures.

Figure 20:
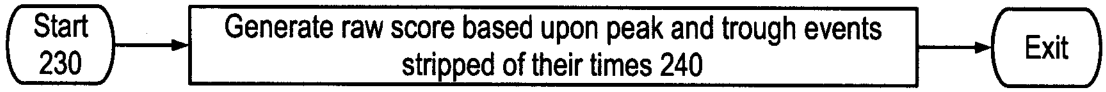

FIG. 20 shows a flowchart of some details of program step 230 of FIG. 19 that may further support generating the raw score based upon the match of the peak event and the trough event by including the program step 240 that supports generating the raw score 36 based upon the peak events 114 and the trough events 119 stripped of their times 118.

Figure 21:
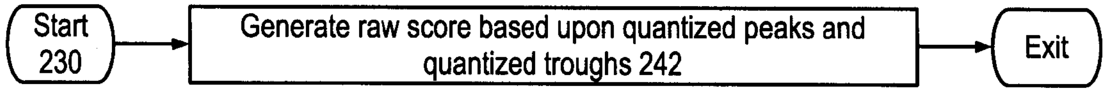

FIG. 21 shows a flowchart of some details of program step 230 of FIG. 19 that may further support generating the raw score based upon the match of the peak event and the trough event by including the program step 242 that supports generate the raw score 36 based upon quantized peaks 114 and quantized troughs 116. In certain embodiments, the quantization may be effected by removing a small difference trough followed by a small distance peak from the vehicle signature 26 for the purpose of the raw score calculation. The quantization may be effected by rounding the strengths 116 and 117 to the nearest integer, for example.

Figure 22:
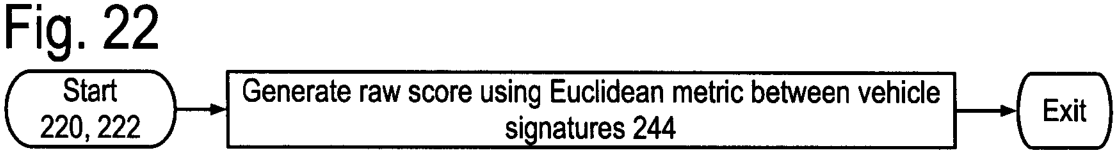

FIG. 22 shows a flowchart of some details of program step 220 and/or program step 222 of FIG. 18 that may further support the generating of the raw score by program step 244 that supports generating the raw score 36 using a Euclidean metric. The Euclidean metric may act differently for different dimensional entries, possibly favoring the Z-readings 154 with larger scaling factors that the other readings.

Figure 23:
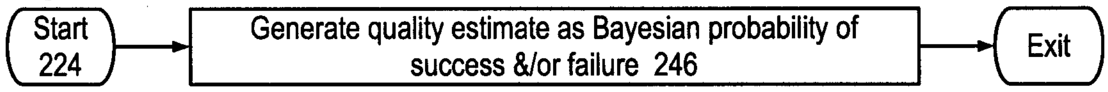

FIG. 23 shows a flowchart of some details of program step 224 of FIG. 18 that may support generating the quality estimate by the program step 246 that supports generating the quality estimate 37 as a Bayesian probability of success and/or failure of the raw score to match the vehicle signatures 26.

FIGS. 24 to 27 show flowcharts of some details of program step 204 of FIG. 15 that further match the vehicle signatures for a segment from the scorecard of its first and successor sensor pod to create the in-out vehicle match table 32.

Figure 24:
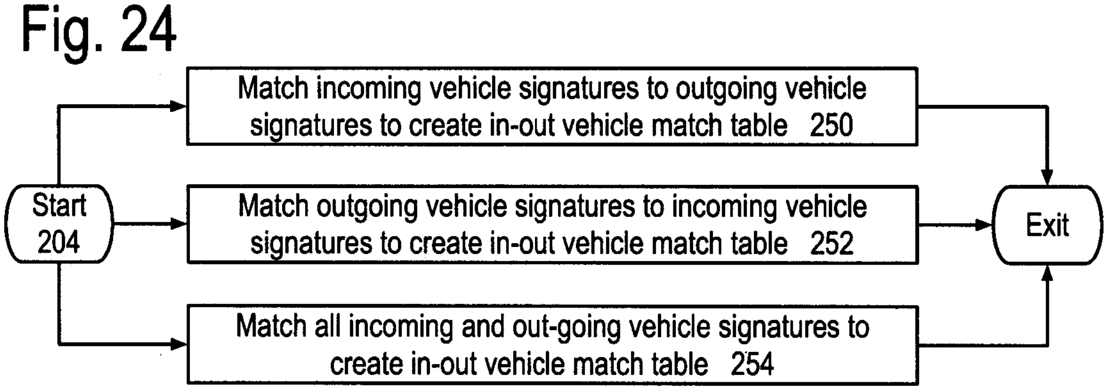

FIG. 24 discusses alternative matching schemes as follows:

Program step 250 supports matching the incoming 122 vehicle signatures 26 to the outgoing 124 vehicle signatures to create the in-out vehicle match table 32.

Program step 252 supports matching the outgoing 124 vehicle signatures 26 to the incoming 122 vehicle signatures to create the in-out vehicle match table 32.

And program step 254 supports matching all incoming 122 and outgoing 124 vehicle signatures 26 to create the in-out vehicle match table 32.

Figure 25:
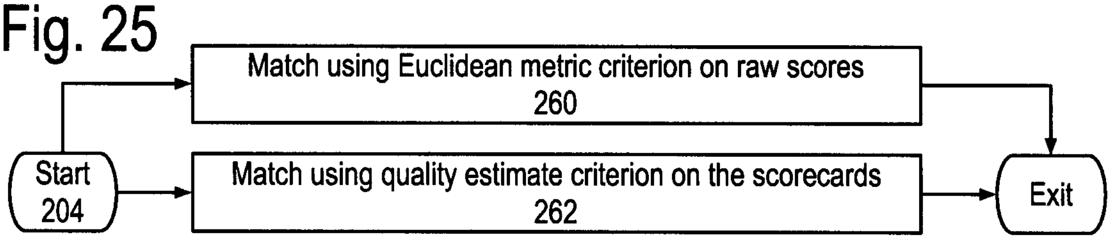

FIG. 25 discusses alternative matching criterion as follows:

Program step 260 supports matching using a Euclidean metric criterion on the raw scores 36.

And program step 262 supports matching using a quality estimate 37 criterion on the scorecards 34.

Figure 26:
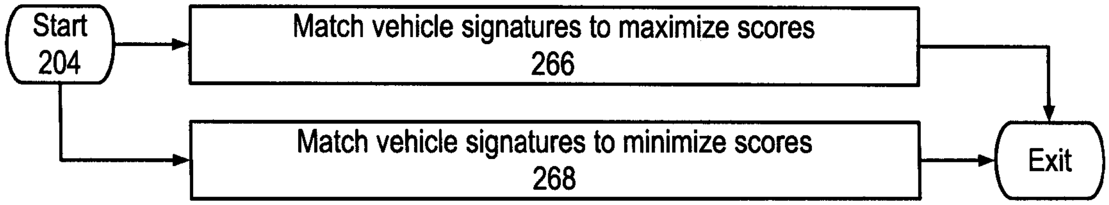

FIG. 26 discusses alternative matching criterion as various optimizations as follows:

Program step 266 supports matching the vehicle signatures 26 to maximize the scores 34 and/or 36.

Program step 268 supports matching the vehicle signatures 26 to minimize the scores 34 and/or 36.

Figure 27:
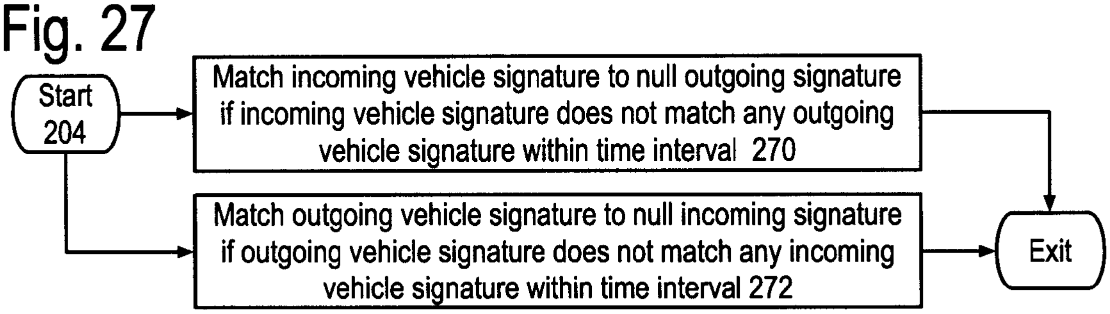

FIG. 27 discusses matching a vehicle signature to a null signature as follows:

Program step 270 supports matching the incoming 122 vehicle signature 26 to a null outgoing signature if the incoming vehicle signature does not match any outgoing 124 vehicle signature within a time interval.

And program step 272 supports matching the outgoing 124 vehicle signature 26 to a null incoming 122 vehicle signature if the outgoing vehicle signature does not match any incoming vehicle signature within the time interval.

Figure 28:
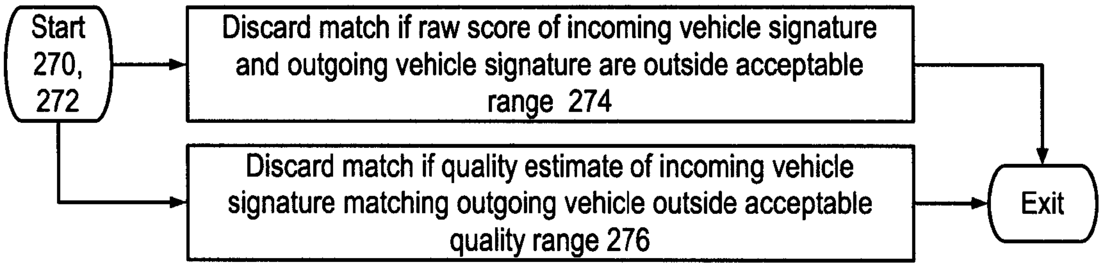
Figure 29:
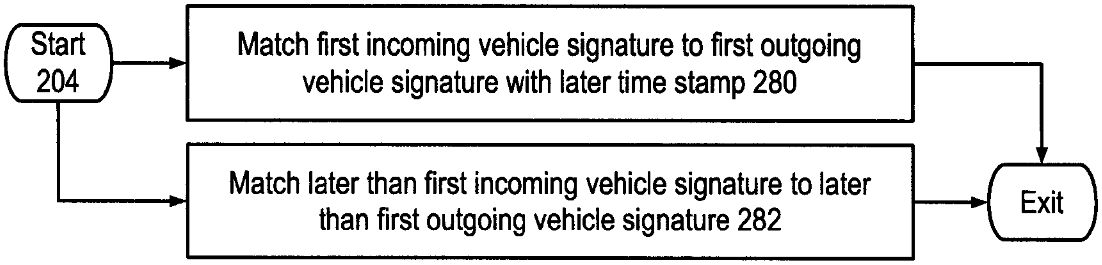

FIG. 28 shows a flowchart of some details of program step 270 and/or program step 272 of FIG. 27 regarding matching null vehicle signatures, that may include at least one of the following program steps:

Program step 274 supports discarding the match if the raw score 36 of the incoming 122 vehicle signature 26 and the outgoing 124 vehicle signature are outside an acceptable range.

And program step 276 supports discarding the match if the quality estimate 37 of incoming 122 vehicle signature 26 matching outgoing 124 vehicle signature is outside an acceptable quality range.

FIG. 27 shows a flowchart of some details of program step 204 of FIG. 16 that further match the vehicle signatures for a segment from the scorecard of its first and successor sensor pod to create the in-out vehicle match table 32 that may include at least one of the following program steps:

Program step 280 supports matching the first incoming 122 vehicle signature 26 to the first outgoing 124 vehicle signature with a later time stamp 113. This program step may be of use when the roadway information network shares a global time count that is reliably broadcast to the sensor pods 20, their sensors 130, 132 and/or 135, and/or to the means 62.

Once the current match's incoming 122 and outgoing 124 vehicle signatures 26 have been removed, the following program step may be useful: Program step 282 supports matching a later than the first incoming 122 vehicle signature 26 to a later than first outgoing 124 vehicle signature.

Figure 30:
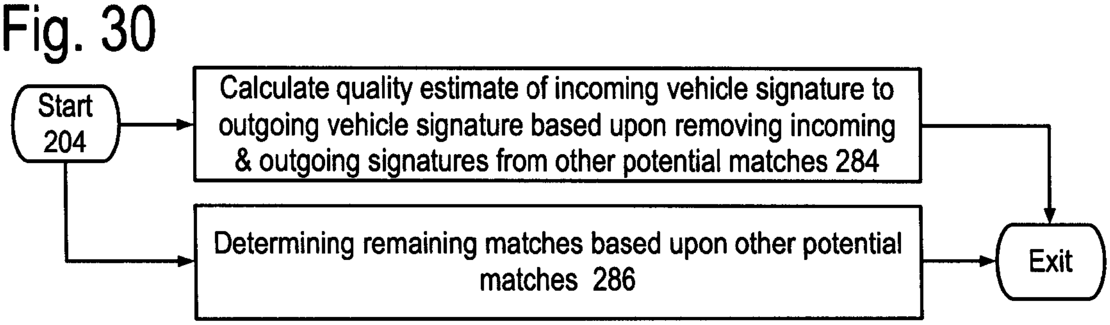

FIG. 30 shows a flowchart of some details of program step 204 of FIG. 16 that further match the vehicle signatures for the segment from the scorecard of its first and successor sensor pod to create the in-out vehicle match table 32 that may include the following.

Program step 284 supports calculating the quality estimate 37 of the incoming 122 vehicle signature 26 to the outgoing 124 vehicle signature based upon removing the incoming and outgoing vehicle signatures from other potential matches.

And program step 286 supports determining the remaining matches based upon the other potential matches.

Figure 31:
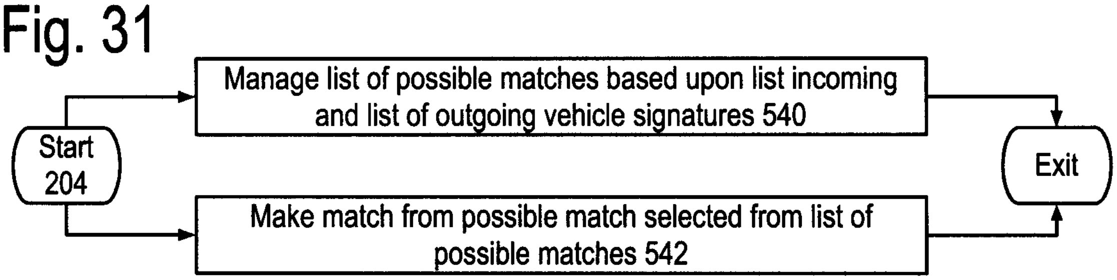

FIG. 31 shows a flowchart of some details of program step 204 of FIG. 16 that further match the vehicle signatures for the segment from the scorecard of its first and successor sensor pod to create the in-out vehicle match table 32 that may include the following.

Program step 540 supports managing 510 the list of possible matches 520 based upon the list of incoming vehicle signatures 27 and the list of outgoing vehicle signatures 27.

And program step 542 supports making 530 the match from the list of possible matches 520.

Figure 32:
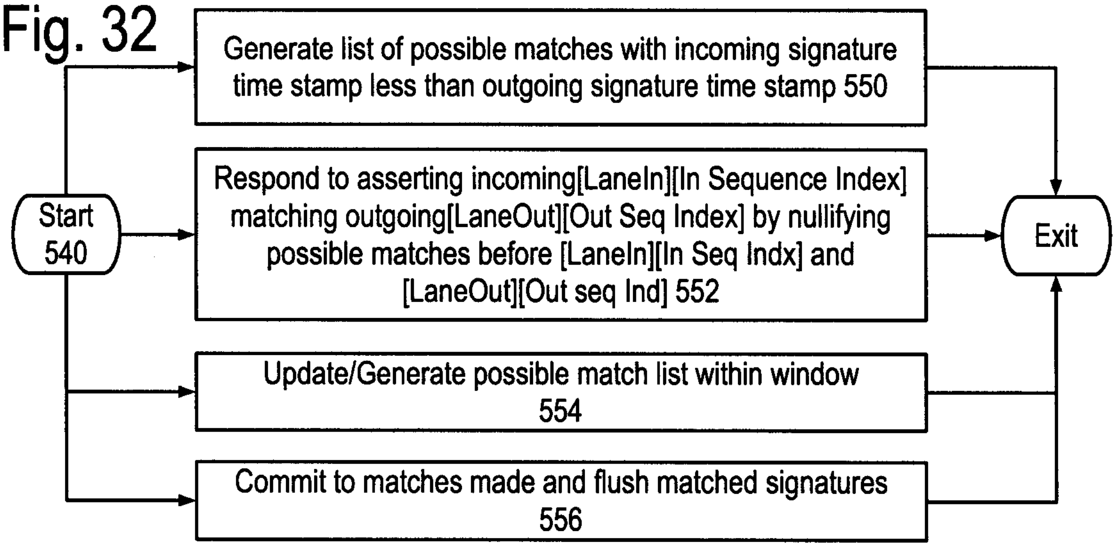

FIG. 32 shows a flowchart of some details of program step 540 of FIG. 31 that manages 510 the list of possible matches 520 based upon the list of incoming vehicle signatures 27 and the list of outgoing vehicle signatures 27, and may include at least one of the following:

Program step 550 supports generating the list of possible matches 520 with the incoming vehicle signature 26 indicated by the incoming vehicle signature identifier 122 having a time stamp 113 less than the time stamp of the outgoing vehicle signature indicated by the outgoing vehicle signature identifier 124.

Program step 552 supports responding to the assertion of an incoming vehicle signature from the LaneI incoming sequence 504 at the Incoming sequence index as matching the outgoing LaneOut Sequence vehicle signature at the Outgoing sequence index by nullifying the possible matches before the LaneIn Incoming Sequence index to the Outgoing LaneO Outgoing Sequence index.

Program step 554 supports updating and/or generating the list of possible matches 520 within a window, which will be described in more detail in FIG. 33.

And program step 556 supports committing to the matches made 530 and flushing the matched signatures from the sequences 500 and 502 as possible the lists of incoming and outgoing vehicle signatures 27.

In certain embodiments, these program steps or in other implementations these operational steps may be triggered as a response by the list manager 510 to receiving a list command 512 from the match maker 530. In certain embodiments, the possible match 514 may be provided by the list manager 510 in response to one or more of these list commands 512.

Figure 33:
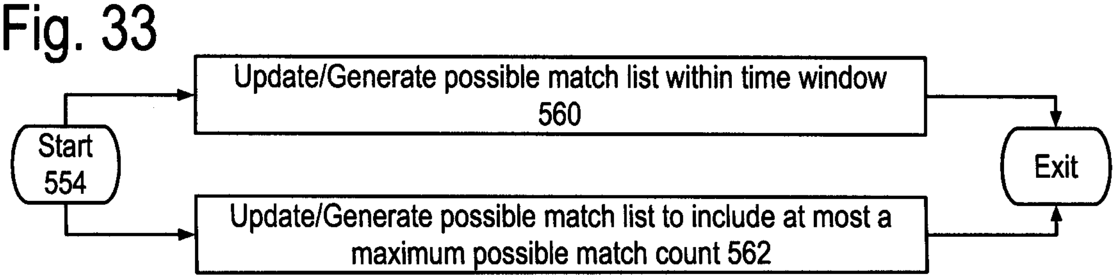

FIG. 33 shows a flowchart of some details of program step 554 of FIG. 32 that updates and/or generates the list of possible matches 520 within a window as including at least one of the following:

Program step 550 supports updating and/or generating the list of possible matches 520 within a time window, such as 30 seconds, a minute, and/or several minutes. Note that the time window may vary over time, possibly being fairly short during a rush hour and longer during times of less traffic congestion.

Program step 552 supports updating and/or generating the list of possible matches to include at most a maximum possible match count, such as a multiple of the total number of incoming lanes multiplied by the total number of outgoing lanes 8.

Figure 34:
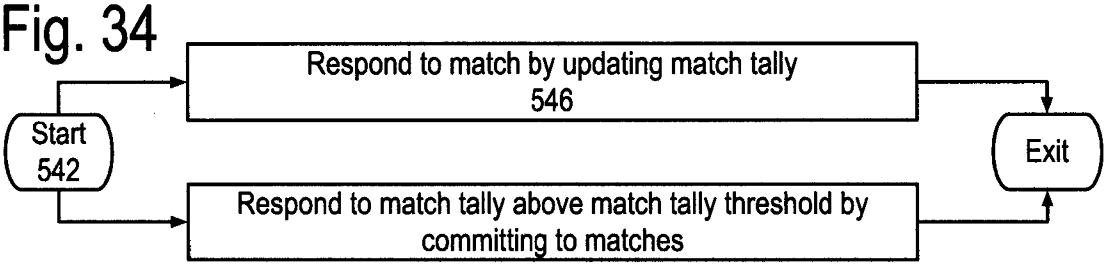

FIG. 34 shows a flowchart of some details of program step 542 of FIG. 31 of making 530 the match from the list of possible matches 520.

Program step 550 supports responding to the match by updating the match tally 532.

Program step 552 supports responding to the match tally 532 being above the match tally threshold 534 by committing 556 to the matches. The match maker 530 may further communicate with the means for generating 90 to commit to the vehicle movement estimates 80 of the node movement estimate 30, which are then sent to the means for using 100 them to create the traffic feedback 92.

Said another way, the match maker 530 may update a match tally 532 when the match is asserted and may respond to the match tally exceeding the match tally threshold 534 by committing the matches and the use of the in-out vehicle match table to update the vehicle movement estimates 80 that may then be used by the roadway information system 14, because these estimates are now accurate enough. This is a preemptive triggering of the generation of the vehicle movement estimates 80 as soon as the estimates are deemed accurate enough.

Figure 35:
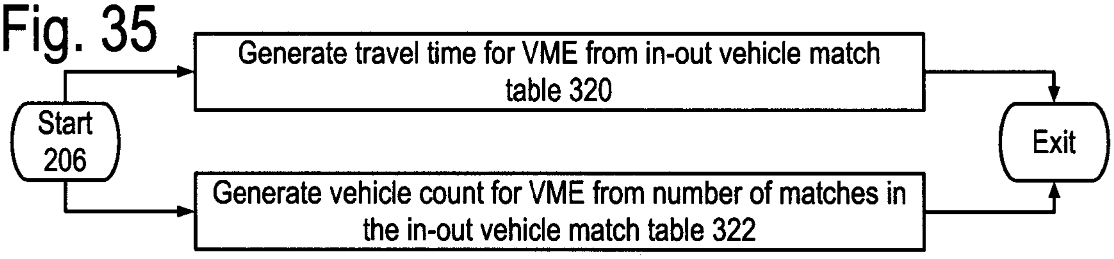

FIG. 35 shows a flowchart of some details of program step 206 of FIG. 16 that supports generating the vehicle movement estimate 80 from the in-out vehicle match table 32 that may include at least one of the following program steps:

Program step 320 supports generating the travel time 82 from the in-out vehicle match table.

And program step 322 supports generating the vehicle count 84 from the number of matches in the in-out vehicle match table.

Figure 36:
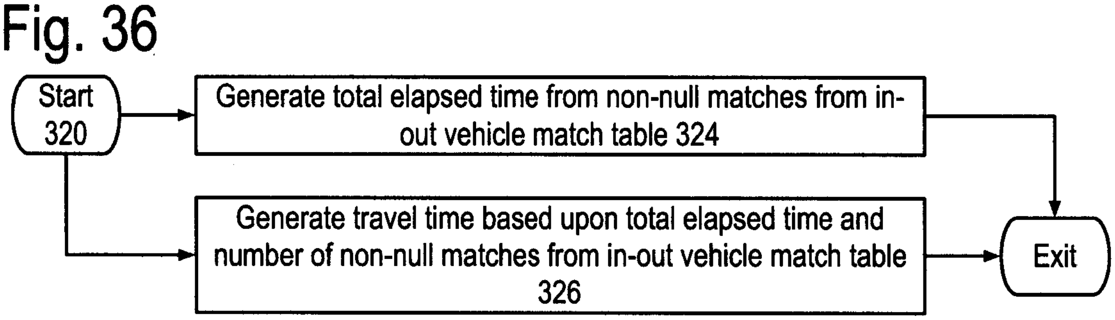

FIG. 36 shows a flowchart of some details of program step 320 of FIG. 35 further generating the travel time 82 of the vehicle movement estimate 80.

Program step 324 supports generating a total elapsed time from non-null matches in the in-out vehicle match table.

And program step 326 supports generating the travel time based upon the total elapsed time and the number of non-null matches from the in-out vehicle match table.

Figure 37:
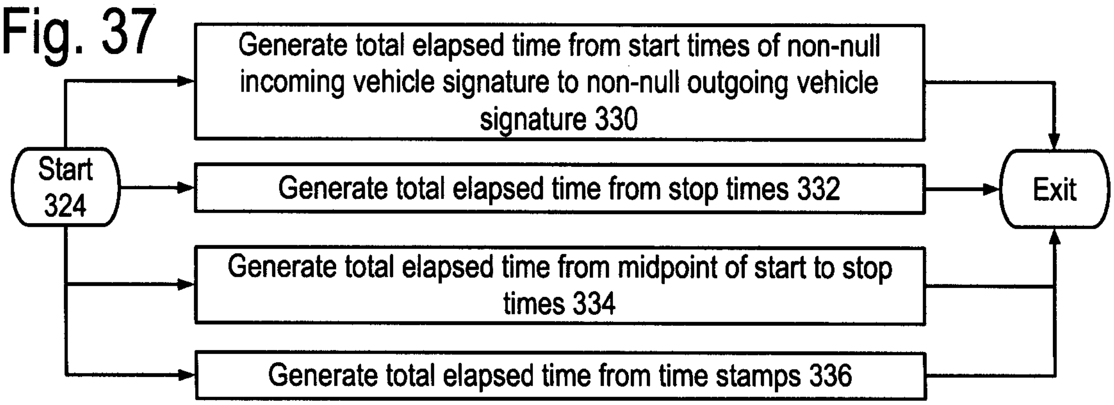

FIG. 37 shows a flowchart of some details of program step 324 of FIG. 36 that further generates the total elapsed travel time from non-null matches. As used herein a non-null match refers to a match where neither the incoming 122 vehicle signature 26 nor the outgoing 124 vehicle signature is null. At least one of the following Program step 330 supports generating the elapsed time from the start times 111.

Program step 332 supports generating the elapsed time from the stop times 112.

Program step 334 supports generating the elapsed time from the midpoint of the start times 111 and the stop times 112.

And program step 336 supports generating the elapsed time from the time stamps 113.

Figure 38:
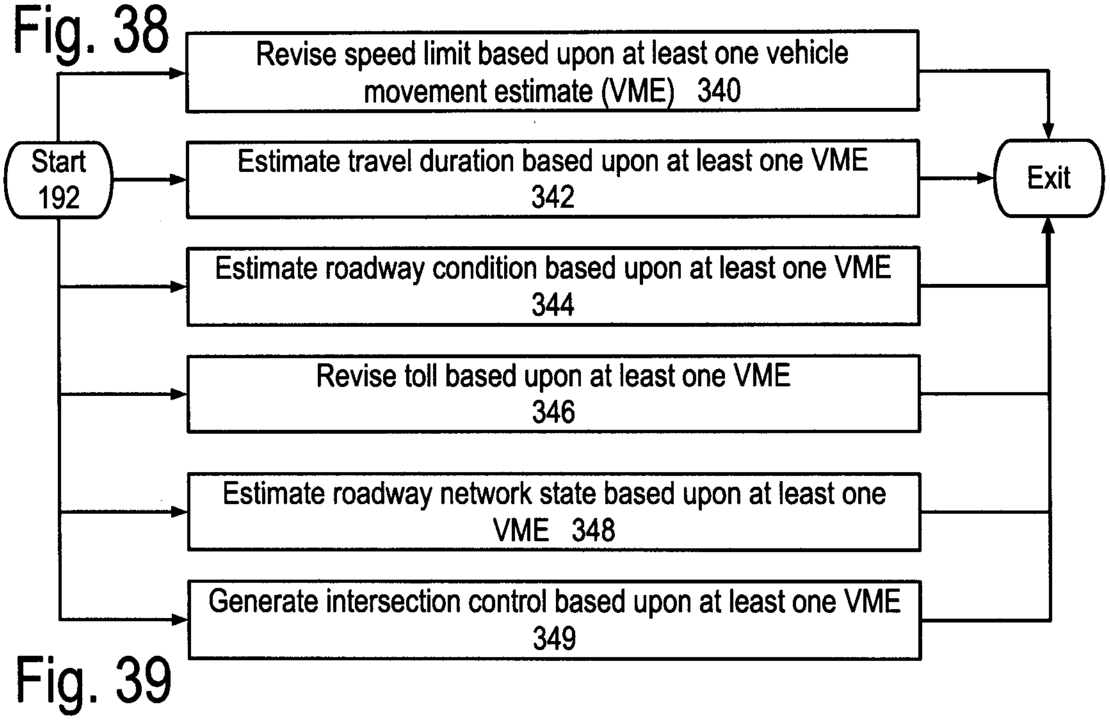

FIG. 38 shows a flowchart of some details of program step 192 of FIG. 15 to further use the vehicle movement estimate (VME) 80 to create at least one traffic feedback 92 that may include at least one of the following program steps, each of which is based upon at least one of the VME:

Program step 340 supports revising the speed limit 102.

Program step 342 supports estimating the travel duration 103.

Program step 344 supports estimating the roadway condition 104.

Program step 346 supports revising the toll 106.

Program step 348 supports estimating the roadway network state 108.

And program step 349 supports generating the intersection control 109.

Figure 39:
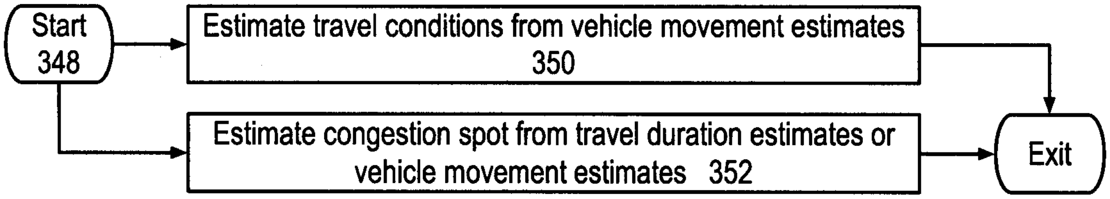

FIG. 39 shows a flowchart of some details of program step 348 of FIG. 38 further estimating the roadway network state 108 that may include at least one of the following that are also based upon the VME 80:

Program step 350 supports estimating the travel conditions.

And program step 352 supports estimating a congestion spot.

Figure 40:
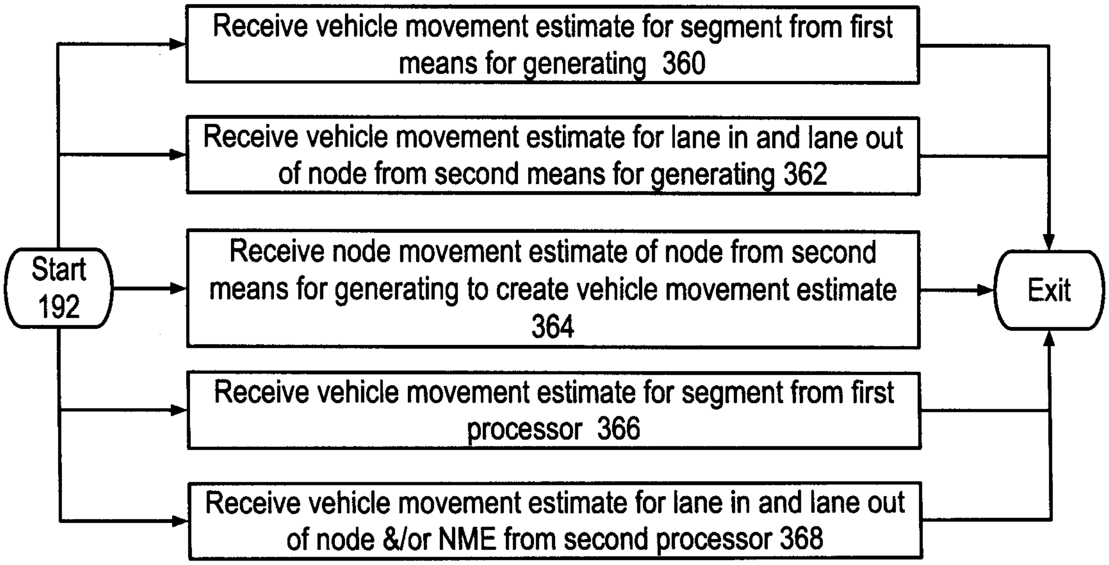

FIG. 40 shows a flowchart of some details of program step 192 of FIG. 15 that support use of the vehicle movement estimates 80, possibly by the means for using 100 and/or one of the processors 60. The program step 192 may further include at least one of the following:

Program step 360 supports receiving the VME 80 for the segment 12 from the first means for generating 90 as first shown in FIG. 1A.

Program step 362 supports receiving the VME 80 for the lane 8 in and lane out of the multiple input-output roadway node 4 from the means for generating 90 as first shown in FIG. 1B.

Program step 364 supports receiving the node movement estimate 30 for the node 4 to create the VME 80.

Program step 366 supports receiving the VME 80 for the segment 12 from the first processor 60 as first shown in FIG. 1C.

And program step 368 supports receiving the VME for the lane 8 in and lane out of the multiple input-output roadway node 4 and/or the node movement estimate 30 from the second processor 60.

Figure 41:
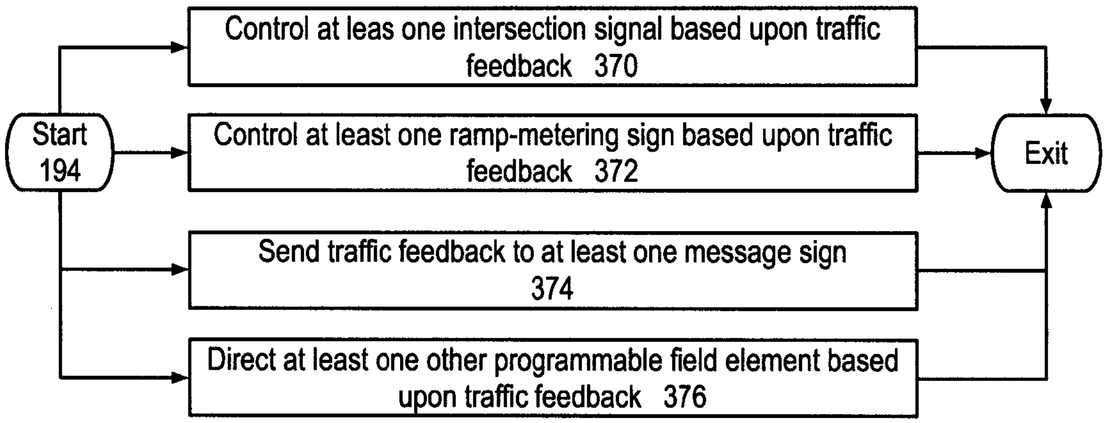

FIG. 41 shows a flowchart of some details of program step 194 of FIG. 15 that further supports operating at least one programmable field device 70 based upon the traffic feedback 92 that may include at least one of the following, each of which is based upon the traffic feedback:

Program step 370 supports controlling at least one intersection sign 74.

Program step 372 supports controlling at least one ramp metering sign 76.

Program step 374 supports sending traffic feedback 92 to at least one message sign 78.

And program step 376 supports directing at least one other programmable field element.

Figure 42:

FIG. 42 shows a flowchart of some details of program step 370 of FIG. 41 further controlling at least one intersection sign 74 by including program step 380 that supports sending the intersection control 109 to the intersection sign.

Figure 43:

FIG. 43 shows a flowchart of some details of program step 372 of FIG. 41 further controlling the ramp metering sign 76 by including the program step 382 that supports sending the meter control 105 to the ramp metering sign 76.

Figure 44:
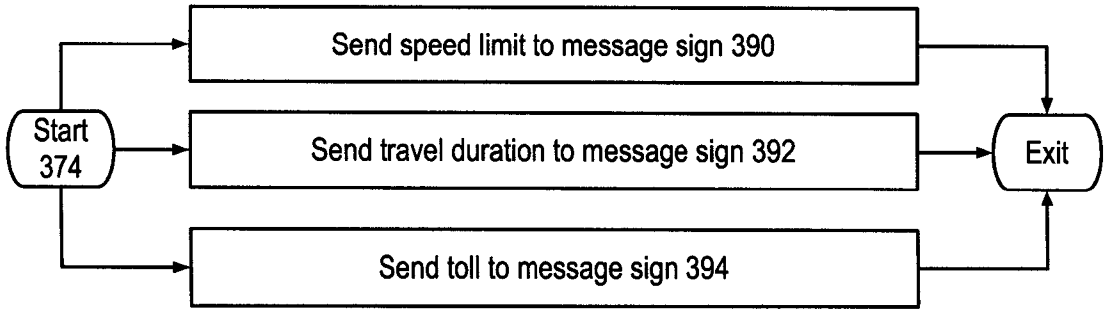

FIG. 44 shows a flowchart of some details of program step 376 of FIG. 41 further sending the traffic feedback 92 to the message sign 78 as possibly including at least one of the following:

Program step 390 supports sending the speed limit 102.

Program step 392 supports sending the travel duration 103.

And program step 394 supports sending the toll 106.

The preceding embodiments provide examples of the invention and are not meant to constrain the scope of the following claims.

The invention claimed is:

1. Apparatus, comprising a generating processor (60) configured to access a list (25) of incoming vehicle signatures (26) based upon sensor readings (22) of a first sensor pod (20) of incoming vehicles (6), a list of outgoing vehicle signatures based upon said sensor readings of a second sensor pod of outgoing vehicles to create an in-out vehicle match table 32 to estimate a travel time (82) between said first and said second sensor pod and a vehicle count (84) of said vehicles passing between said first and said second sensor pod; and wherein said apparatus further comprises at least one of a server containing an installation package and configured to communicate said installation package to a processor to affect a configuration of said generating processor; and a computer readable memory configured to affect said configuration of said generating processor.

2. The apparatus of claim 1, further comprising a matching processor configured to generate at least one vehicle movement estimate including said travel time and said vehicle count.

3. The apparatus of claim 2, wherein said at least one of said generating processor coupled with at least one of said matching processor to access said list of said incoming vehicle signatures and said list of said outgoing vehicle signatures to create said in-out vehicle match table.

4. The apparatus of claim 2, wherein said at least one instance of said generating processor includes said instance of said matching processor.

5. The apparatus of claim 1, wherein at least one of a matching processor and/or said generating processor includes at least one of:

a finite state machine, a configuration module configured to initialize a programmable logic device to create said finite state machine, a computer accessibly coupled to a computer readable memory including a program system comprising at least one program step for instructing said computer, an inferential engine directed by a rule system including at least one member of an inference group consisting of at least one fact and at least one inference rule;

wherein said apparatus further includes at least one member of the group consisting of said server containing said installation package for at least one member of the group consisting of said configuration module, said program system and said rule system, with said server configured to communicate said installation package to at least one member of the group consisting of said finite state machine, said computer and said inferential engine; and said computer readable memory including at least one member of the group consisting of configuration module, said program system, said rule system, and said installation package.

6. The apparatus of claim 5, wherein said program system includes at least one member of the group consisting of the program steps of:

matching said incoming vehicle signatures to said outgoing vehicle signatures to create said in-out vehicle match table;

matching said outgoing vehicle signatures to said incoming vehicle signatures to create said in-out vehicle match table; and matching all of said incoming vehicle signatures and said outgoing vehicle signatures to create said in-out vehicle match table.

7. The apparatus of claim 5, wherein said program system includes the program step of:

matching based upon a scorecard of said incoming vehicle signature to said outgoing vehicle signature, for said incoming vehicle signature in said list of incoming vehicle signatures and for said outgoing vehicle signature in said list of said outgoing vehicle signatures.

8. The apparatus of claim 7, wherein said program system includes at least one member of the group consisting of:

matching using a Euclidean metric criterion based upon a raw score included in said scorecard; and matching using a quality estimate criterion based upon a quality estimate included in said scorecard.

9. The apparatus of claim 8, wherein said program system includes at least one member of the group consisting of:

discarding a match if said raw score of said incoming vehicle signature to said outgoing vehicle signature is outside an acceptable range; and discarding said match if said quality estimate of said incoming vehicle signature to said outgoing vehicle signature is outside an acceptable quality range.

10. The apparatus of claim 5, wherein said program system includes at least one member of the group consisting of:

matching said incoming vehicle signature to a null outgoing vehicle signature if said incoming vehicle signature does not match any of said outgoing vehicle signatures; and matching said outgoing vehicle signature to a null incoming vehicle signature if said outgoing vehicle signature does not match any of said incoming vehicle signatures.

11. The apparatus of claim 5, wherein said program system includes at least one member of the group consisting of:

matching a first incoming vehicle signature to a first outgoing vehicle signature with a later time stamp; and matching a later than said first incoming vehicle signature to a later than said first outgoing vehicle signature.

12. The apparatus of claim 5, wherein said program system further comprises the program steps of:

calculating a quality estimate of said incoming vehicle signature matching said outgoing vehicle signature based upon removing said incoming vehicle signature and said outgoing vehicle signature from other potential matches; and determining remaining matches based upon said other potential matches.

13. A method, comprising the step of:

operating a processor; and wherein said method further comprises at least one of the steps of operating a server to deliver an installation package for installation on said processor in support of said step of operating said processor; and using a computer readable memory to support said step of operating said processor;

wherein the step of operating said processor, comprises at least one of the steps of:

matching incoming vehicle signatures to outgoing vehicle signatures to create an in-out vehicle match table;

matching said outgoing vehicle signatures to said incoming vehicle signatures to create said in-out vehicle match table; and matching all of said incoming vehicle signatures and said outgoing vehicle signatures to create said in-out vehicle match table.

14. The method of claim 13, wherein the step operating said processor includes the step of:

matching based upon a scorecard of said incoming vehicle signature to said outgoing vehicle signature, for said incoming vehicle signature in said list of incoming vehicle signatures and for said outgoing vehicle signature in said list of said outgoing vehicle signatures.

15. The method of claim 14, wherein the step operating said processor includes at least one member of the group consisting of the steps of:

matching using a Euclidean metric criterion based upon a raw score included in said scorecard; and matching using a quality estimate criterion based upon a quality estimate included in said scorecard.

16. The method of claim 15, wherein the step operating said processor includes at least one member of the group consisting of the steps of:

discarding a match if said raw score of said incoming vehicle signature to said outgoing vehicle signature is outside an acceptable range; and discarding said match if said quality estimate of said incoming vehicle signature to said outgoing vehicle signature is outside an acceptable quality range.

17. The method of claim 13, wherein the step operating said processor further includes at least one member of the group consisting of the steps of:

matching said incoming vehicle signature to a null outgoing vehicle signature if said incoming vehicle signature does not match any of said outgoing vehicle signatures; and matching said outgoing vehicle signature to a null incoming vehicle signature if said outgoing vehicle signature does not match any of said incoming vehicle signatures.

18. The method of claim 13, wherein the step operating said processor includes at least one member of the group consisting of the steps of:

matching a first incoming vehicle signature to a first outgoing vehicle signature with a later time stamp;

matching a later than said first incoming vehicle signature to a later than said first outgoing vehicle signature.

19. The method of claim 13, wherein the step operating said processor further comprises the steps of:

calculating a quality estimate of said incoming vehicle signature matching said outgoing vehicle signature based upon removing said incoming vehicle signature and said outgoing vehicle signature from other potential matches; and determining remaining matches based upon said other potential matches.

20. The method of claim 13, wherein the step of operating said server further comprises at least one member of the group consisting of:

delivering said installation package to create a program system to at least partly operate a computer in said processor;

delivering said program system to a memory accessibly coupled to said computer;

delivering said installation package to provide a rule system for use by an inferential engine in said processor;

delivering said rule system to said memory;

delivering said installation package to create a configuration module for a finite state machine in said processor; and delivering said configuration module to a memory; and wherein the step of using said computer readable memory further comprises the step of using said computer readable memory containing at least one member of the group of said installation package, said program system, said rule system, and said configuration module.

21. Apparatus, comprising:

means for matching (110) configured to access a list (25) of incoming vehicle signatures (26) based upon sensor readings (22) of a first sensor pod (20) of incoming vehicles (6), a list of outgoing vehicle signatures based upon said sensor readings of a second sensor pod of outgoing vehicles to create an in-out vehicle match table (32) to estimate a travel time (82) between said first and said second sensor pod and a vehicle count (84) of said vehicles passing between said first and said second sensor pod; and wherein said apparatus further comprises at least one member of the group consisting of a server containing an installation package and configured to communicate said installation package to at least partly configure said means for matching; and a computer readable memory configured to said at least partly configure said means for matching.

22. The apparatus of claim 21, further comprising:

at least one instance of a means for generating (100) at least one vehicle movement estimate including said travel time and said vehicle count.

23. The apparatus of claim 22, wherein said at least one instance of said means for generating group coupled with said instance of said means for matching to access said list of said incoming vehicle signatures and said list of said outgoing vehicle signatures to create said in-out vehicle match table.

24. The apparatus of claim 22, wherein said at least one instance of said means for generating includes said instance of said means for matching.

25. The apparatus of claim 21, wherein at least one of said means for matching includes at least one instance of at least one member of the group consisting of:

a finite state machine, a configuration module configured to initialize a programmable logic device to create said finite state machine, a computer accessibly coupled to a computer readable memory including a program system comprising at least one program step for instructing said computer, an inferential engine directed by a rule system including at least one member of an inference group consisting of at least one fact and at least one inference rule;

wherein said apparatus further includes at least one member of the group consisting of said server containing said installation package for at least one member of the group consisting of said configuration module, said program system and said rule system, with said server configured to communicate said installation package to at least one member of the group consisting of said finite state machine, said computer and said inferential engine; and said computer readable memory including at least one member of the group consisting of configuration module, said program system, said rule system, and said installation package.

26. The apparatus of claim 25, wherein said program system includes at least one member of the group consisting of the program steps of:

matching said incoming vehicle signatures to said outgoing vehicle signatures to create said in-out vehicle match table;

matching said outgoing vehicle signatures to said incoming vehicle signatures to create said in-out vehicle match table; and matching all of said incoming vehicle signatures and said outgoing vehicle signatures to create said in-out vehicle match table.

27. The apparatus of claim 25, wherein said program system includes the program step of:

matching based upon a scorecard of said incoming vehicle signature to said outgoing vehicle signature, for said incoming vehicle signature in said list of incoming vehicle signatures and for said outgoing vehicle signature in said list of said outgoing vehicle signatures.

28. The apparatus of claim 27, wherein said program system includes at least one member of the group consisting of:

matching using a Euclidean metric criterion based upon a raw score included in said scorecard; and matching using a quality estimate criterion based upon a quality estimate included in said scorecard.

29. The apparatus of claim 28, wherein said program system includes at least one member of the group consisting of:

discarding a match if said raw score of said incoming vehicle signature to said outgoing vehicle signature is outside an acceptable range; and discarding said match if said quality estimate of said incoming vehicle signature to said outgoing vehicle signature is outside an acceptable quality range.

30. The apparatus of claim 25, wherein said program system includes at least one member of the group consisting of:

matching said incoming vehicle signature to a null outgoing vehicle signature if said incoming vehicle signature does not match any of said outgoing vehicle signatures; and matching said outgoing vehicle signature to a null incoming vehicle signature if said outgoing vehicle signature does not match any of said incoming vehicle signatures.

31. The apparatus of claim 25, wherein said program system includes at least one member of the group consisting of:

matching a first incoming vehicle signature to a first outgoing vehicle signature with a later time stamp; and matching a later than said first incoming vehicle signature to a later than said first outgoing vehicle signature.

32. The apparatus of claim 25, wherein said program system further comprises the program steps of:

calculating a quality estimate of said incoming vehicle signature matching said outgoing vehicle signature based upon removing said incoming vehicle signature and said outgoing vehicle signature from other potential matches; and determining remaining matches based upon said other potential matches.

* * * * *